US009336738B2

(12) United States Patent
Yanagi et al.

(10) Patent No.: US 9,336,738 B2
(45) **Date of Patent: *May 10, 2016**

(54) DISPLAY CONTROLLER CONFIGURED TO MAINTAIN A STABLE PIXEL WRITING PERIOD AND A GATE SLOPE PERIOD WHEN A REFRESH RATE IS CHANGED, DISPLAY DEVICE, AND CONTROL METHOD FOR CONTROLLING DISPLAY SYSTEM AND DISPLAY DEVICE

(71) Applicant: Sharp Kabushiki Kaisha, Osaka-shi, Osaka (JP)

(72) Inventors: Toshihiro Yanagi, Osaka (JP); Takuji Miyamoto, Osaka (JP); Atsuhito Murai, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/518,553

(22) Filed: Oct. 20, 2014

(65) Prior Publication Data

US 2015/0035815 A1 Feb. 5, 2015

Related U.S. Application Data

(62) Division of application No. 12/309,978, filed as application No. PCT/JP2007/081634 on Jun. 8, 2007, now Pat. No. 8,896,590.

(30) Foreign Application Priority Data

Sep. 5, 2006 (JP) ................................ 2006-240776

(51) Int. Cl.

*G06F 3/038* (2013.01)
*G09G 5/00* (2006.01)
*G09G 3/36* (2006.01)

(52) U.S. Cl.

CPC ............. *G09G 3/3677* (2013.01); *G09G 5/008* (2013.01); *G09G 2310/062* (2013.01); *G09G 2310/08* (2013.01); *G09G 2370/08* (2013.01)

(58) Field of Classification Search

None

See application file for complete search history.

(56) References Cited

U.S. PATENT DOCUMENTS 5,559,620 A 9/1996 Tanaka et al.
5,587,722 A 12/1996 Suzuki et al.

(Continued)

FOREIGN PATENT DOCUMENTS

JP H05197356 B2 8/1993
JP H063647 A 1/1994

(Continued)

*Primary Examiner* — Ilana Spar
*Assistant Examiner* — Kirk Hermann
(74) *Attorney, Agent, or Firm* — Harness, Dickey & Pierce, P.L.C.

(57) ABSTRACT

In one or more example embodiments, a display controller includes a stable pixel writing period in one horizontal period in a display device, the stable pixel writing period being a period during which a voltage outputted from a gate driver is at a high level. The display controller also includes a first stable pixel writing period determination circuit which determines, by using a reference signal independent from the frame rate in the display device, the stable pixel writing period during which the voltage is at the high level. Thus, the display controller can be provided in which, regardless of whether and how the frame rate is changed, the stable pixel writing period can be of a target length.

12 Claims, 28 Drawing Sheets

(56) References Cited

U.S. PATENT DOCUMENTS

| | | | | |
|---|---|---|---|---|
| 5,821,910 | A | 10/1998 | Shay | |
| 6,359,607 | B1 | 3/2002 | Yanagi et al. | |
| 2002/0015016 | A1 | 2/2002 | Kudo et al. | |
| 2005/0078101 | A1 | 4/2005 | Shigeta | |
| 2005/0243051 | A1 * | 11/2005 | Kudo | G09G 3/3696 345/99 |
| 2007/0002036 | A1 | 1/2007 | Kardach et al. | |
| 2007/0057884 | A1 | 3/2007 | Akai et al. | |

FOREIGN PATENT DOCUMENTS

| | | | |
|---|---|---|---|
| JP | H09265077 | A | 10/1997 |
| JP | H11174415 | A | 7/1999 |
| JP | 2003114648 | A | 4/2003 |
| JP | 2003345317 | A | 12/2003 |
| JP | 2004287164 | A | 10/2004 |

* cited by examiner

FIG.5

| | | | | | |
|---|---|---|---|---|---|
| DOT CLOCK FREQUENCY | 48 | MHz | ⇔ | 32 | MHz |
| CLOCK COUNTER | 1290 | CK | ⇔ | 1290 | CK |
| HORIZONTAL SYNCHRONIZATION SIGNAL CYCLE | 26.9 | μsec | ⇔ | 40.3 | μsec |
| GOE SIGNAL_HIGH WIDTH | 16.9 | μsec | ⇔ | 16.9 | μsec |
| TGON PERIOD (STABLE PIXEL WRITING PERIOD) | 16.9 | μsec | ⇔ | 16.9 | μsec |
| REFRESH RATE | 60 | Hz | ⇔ | 40 | Hz |

FIG.6

CASE OF DISPLAY DEVICE A

| SETTING | REGISTER | TGON PERIOD (STABLE PIXEL WRITING PERIOD) |
|---|---|---|
| ○ | 0 0 | 10 μsec |
| | 0 1 | 15 μsec |
| | 1 0 | 20 μsec |
| | 1 1 | 25 μsec |

CASE OF DISPLAY DEVICE B

| SETTING | REGISTER | TGON PERIOD (STABLE PIXEL WRITING PERIOD) |
|---|---|---|
| | 0 0 | 10 μsec |
| | 0 1 | 15 μsec |
| ○ | 1 0 | 20 μsec |
| | 1 1 | 25 μsec |

FIG.9

| | | | | | |
|---|---|---|---|---|---|
| DOT CLOCK FREQUENCY | 48 | MHz | ⇔ | 32 | MHz |
| CLOCK COUNTER | 1290 | CK | ⇔ | 1290 | CK |
| HORIZONTAL SYNCHRONIZATION SIGNAL CYCLE | 26.9 | μsec | ⇔ | 40.3 | μsec |
| GOE SIGNAL_HIGH WIDTH | 811 | CK | ⇔ | 811 | CK |
| TGON PERIOD (STABLE PIXEL WRITING PERIOD) | 16.9 | μsec | ⇔ | 25.3 | μsec |
| REFRESH RATE | 60 | Hz | ⇔ | 40 | Hz |

FIG. 15

| | | | | | |
|---|---|---|---|---|---|
| DOT CLOCK FREQUENCY | 48 | MHz | ⇔ | 32 | MHz |
| CLOCK COUNTER | 1290 | CK | ⇔ | 1290 | CK |
| HORIZONTAL SYNCHRONIZATION SIGNAL CYCLE | 26.9 | μsec | ⇔ | 40.3 | μsec |
| GS SIGNAL_HIGH WIDTH (PIXEL WRITING PERIOD) | – | CK | ⇔ | – | CK |
| | 16.9 | μsec | | 30.3 | μsec |
| GS SIGNAL_LOW WIDTH (GATE SLOPE PERIOD) | – | CK | ⇔ | – | CK |
| | 10.0 | μsec | | 10.0 | μsec |
| REFRESH RATE | 60 | Hz | ⇔ | 40 | Hz |

FIG. 16

CASE OF DISPLAY DEVICE A

| SETTING | REGISTER | GS SIGNAL_LOW WIDTH (GATE SLOPE PERIOD) |
|---|---|---|
| ○ | 0 0 | 5 μsec |
| | 0 1 | 10 μsec |
| | 1 0 | 15 μsec |
| | 1 1 | 20 μsec |

⇔

CASE OF DISPLAY DEVICE B

| SETTING | REGISTER | GS SIGNAL_LOW WIDTH (GATE SLOPE PERIOD) |
|---|---|---|
| | 0 0 | 5 μsec |
| | 0 1 | 10 μsec |
| ○ | 1 0 | 15 μsec |
| | 1 1 | 20 μsec |

FIG.22

| | | | | | |
|---|---|---|---|---|---|
| DOT CLOCK FREQUENCY | 48 | MHz | ⇔ | 32 | MHz |
| CLOCK COUNTER | 1290 | CK | ⇔ | 1290 | CK |
| HORIZONTAL SYNCHRONIZATION SIGNAL (Hsync) | 26.9 | μ sec | ⇔ | 40.3 | μ sec |
| G_ON SIGNAL_HIGH WIDTH (STABLE PIXEL WRITING PERIOD) | 16.9 | μ sec | ⇔ | 16.9 | CK |
| GS' SIGNAL_HIGH WIDTH (GATE SLOPE PERIOD) | 5.0 | μ sec | ⇔ | 5.0 | μ sec |
| GOE SIGNAL_LOW WIDTH (GATE OFF PERIOD) | 5.0 | μ sec | ⇔ | 18.4 | CK |
| REFRESH RATE | 60 | Hz | ⇔ | 40 | Hz |

FIG.30

| | | | | | |
|---|---|---|---|---|---|
| DOT CLOCK FREQUENCY | 48 | MHz | ⇔ | 32 | MHz |
| CLOCK COUNTER | 1290 | CK | ⇔ | 1290 | CK |
| HORIZONTAL SYNCHRONIZATION SIGNAL CYCLE | 26.9 | μsec | ⇔ | 40.3 | μsec |
| GS SIGNAL_HIGH WIDTH (PIXEL WRITING PERIOD) | 811 | CK | ⇔ | 811 | CK |
| | 16.9 | μsec | | 25.3 | μsec |
| GS SIGNAL_LOW WIDTH (GATE SLOPE PERIOD) | 479 | CK | ⇔ | 479 | CK |
| | 10.0 | μsec | | 15.0 | μsec |
| REFRESH RATE | 60 | Hz | ⇔ | 40 | Hz |

DISPLAY CONTROLLER CONFIGURED TO MAINTAIN A STABLE PIXEL WRITING PERIOD AND A GATE SLOPE PERIOD WHEN A REFRESH RATE IS CHANGED, DISPLAY DEVICE, AND CONTROL METHOD FOR CONTROLLING DISPLAY SYSTEM AND DISPLAY DEVICE

CROSS-REFERENCE TO RELATED APPLICATIONS

This application is a divisional application of U.S. application Ser. No. 12/309,978 filed Feb. 5, 2009 which claims priority under 35 U.S.C. §119(a) to Japanese Application No. 2006-240776 filed on Sep. 5, 2006, and International Application No. PCT/JP2007/061634 filed on Jun. 8, 2007, the entire contents of each of which are hereby incorporated by reference.

TECHNICAL FIELD

The present invention relates to a display controller for controlling a display device, the display device controlled by the display controller, and a display system including the display device and the display controller.

BACKGROUND ART

A liquid crystal display device is often adopted as a display element in a television or a graphic display. There is a liquid crystal display device that includes a switching element such as a thin film transistor (hereinafter, referred to as a TFT) for each display pixel. In such a liquid crystal display device, even in a case where the number of display pixels is increased, no cross talk is generated between the display pixels neighboring each other. With this liquid crystal display device, it is possible to obtain an excellent display image. In this regard, the liquid crystal display device including the switching element for each display pixel is highly regarded particularly.

As shown in FIG. 24, such a liquid crystal display device mainly includes a liquid crystal display panel 500 and a driving circuit section. The liquid crystal display panel 500 includes a pair of electrode substrates with a liquid crystal composition being provided therebetween. On outer surfaces of the electrode substrates, polarization plates are attached, respectively.

A TFT array substrate, one of the pair of the electrode substrates, includes a plurality of data signal lines S(1) through S(N) and a plurality of scanning signal lines G(1) through G(M) on a transparent insulation substrate 100 made of a material such as a glass. The data signal lines and the scanning signal lines intersect each other and are provided in a matrix manner. On intersections of the data signal lines and the scanning signal lines, switching elements 102 are provided. A switching element 102 is made of a TFT connected to a pixel electrode 103. An alignment film is provided so as to cover these components on a substantially entire surface of the insulation substrate 100. Thus, the TFT array substrate is formed.

As in the case of the TFT array substrate, a counter substrate, which is the other one of the pair of the electrode substrates, includes a counter electrode 101 and an alignment film on an entire surface of a transparent insulation substrate made of a material such as a glass. The counter electrode 101 and the alignment film are laminated on the insulation substrate in this order. The driving circuit section includes a scanning signal line driving circuit 300 connected to each of the scanning signal lines of the liquid crystal panel thus formed, a data signal line driving circuit 200 connected to each of the data signal lines of the liquid crystal panel, and a counter electrode driving circuit COM connected to the counter electrode of the liquid crystal panel.

As shown in FIG. 25, the scanning signal line driving circuit 300 includes (i) a shift register section 300*a* that includes M numbers of flip flops connected to each other by a cascade connection and (ii) selection switches 300*b* switched in accordance with outputs from the flip flops.

A selection switch 300*b* has one input terminal VD1 and the other input terminal VD2. Via the input terminal VD1, a gate ON voltage (Vgh voltage) having a sufficient level to turn on the TFT is inputted, whereas via the input terminal VD2, a gate OFF voltage (Vgl voltage) having a sufficient level to turn off the TFT is inputted. A data signal (GSP) is sequentially transferred to each of the flip flops in accordance with a clock signal (GCK), and then sequentially outputted to each of the selection switches 300*b*. In response to this, the selection switches 300*b* selectively output the Vgh voltages, which turn on TFTs, to the scanning signal lines G(1) through G(M) for one scanning period (TH), and then output the Vgl voltages, which turn off the TFTs, to the scanning signal lines G(1) through G(M). As a result, video signals outputted from the data signal line driving circuit 200 to the data signal lines S(1) through S(N) are written into corresponding pixels, respectively.

Patent Document 1 discloses a scanning signal line driving circuit in which a VD1 voltage is generated in the following circuit. That is, the VD1 voltage is generated in a circuit that, as shown in FIG. 26, includes (i) a capacitor Ccnt and a resistor Rcnt for carrying out an electric charging and discharging, respectively, (ii) an inverter INV for controlling the electric charge and discharge, and (iii) switches SW1 and SW2 for switching between the electric charging and discharging. The switch SW1 includes one terminal via which a signal voltage Vdd is applied. The signal voltage Vdd is a direct voltage having a Vgh voltage at a sufficient level to turn on a TFT. The switch SW1 includes the other terminal which is connected to one end of the resistor Rcnt and that of the capacitor Ccnt. The other end of the resistor Rcnt is grounded via the switch SW2. The switch SW2 is opened and closed in accordance with an Stc signal inputted via the inverter INV. The Stc signal has the same cycle as one scanning period. Also, the switch SW1 is opened and closed in accordance with the Stc signal.

In a case where the Stc signal is at a high level, the switch SW1 is closed, whereas the switch SW2 receives an Stc signal of a low level via the inverter INV, and is opened in response to the Stc signal. In contrast, in a case where the Stc signal is at a low level, the switch SW1 is opened, whereas the switch SW2 receives an Stc signal of a high level via the inverter INV, and is closed in response to the Stc signal.

An output signal VD1 thus generated in the circuit is supplied via the input terminal VD1 of the scanning signal line driving circuit 300 shown in FIG. 25. As shown in FIG. 27, the Stc signal is a timing signal for controlling a gate decay period. The Stc signal has the same cycle as the one scanning period (TH).

While the Stc signal is being at the high level, the switch SW1 is closed, whereas the switch SW2 is opened. As a result, the output signal VD1, which has the same voltage level as the Vgh voltage, is supplied via the input terminal VD1 of the scanning signal line driving circuit 300. In contrast, while the Stc signal is being at the low level, the switch SW1 is opened, whereas the switch SW2 is closed. As such, an electric charge acquired in the capacitor Ccnt is discharged via the resistor Rcnt, thereby gradually decreasing the voltage level. As a result, a waveform of an output signal VD1_a_ appears to be saw-tooth as shown in FIG. 27.

If the output signal VD1 generated in the circuit is supplied via the input terminal VD1 of the scanning signal line driving circuit 300, it is possible to readily obtain a waveform in which a decay (a decay of a gate OFF voltage outputted to each of the scanning signal lines) on the scanning signal lines has a slope (see VG(j) in FIG. 27). By arranging the gate OFF voltage outputted to each of the scanning signal lines so that its waveform has slopes in a saw-tooth manner, as described above, it is possible to control the slope, depending on a signal retarded transfer property of the scanning signal lines. Thus, it is possible to make a level shift to be generated in a pixel electric potential substantially equally on a display plane, the level shift being generated by a parasitic capacitance collaterally associated with the scanning signal lines.

(Patent Document 1)

Japanese Unexamined Patent Application Publication, Tokukai, No. 2003-345317 (published on Dec. 3, 2003)

(Patent Document 2)

Japanese Unexamined Patent Application Publication, Tokukai-hei, No. 6-3647 (published on Jan. 14, 1994)

DISCLOSURE OF INVENTION

According to the technique disclosed in the Patent Document 1, a gate slope period (Vgh decay period) of a GS signal (Stc signal; gate slope signal) is controlled by counting a dot clock. However, in a case where a refresh rate is changed, the dot clock is varied. Thus, the technique disclosed in the Patent Document 1 has a problem that, in the case when the refresh rate is changed, it is not possible to set a stable pixel writing period (Vgh output period) or the gate slope period (Vgh decay period) to a target length.

As such, the technique disclosed in the Patent Document 1 has a problem in that the stable pixel writing period (Vgh output period) and the gate slope period (Vgh decay period) are varied, depending on the refresh rate.

In particular, assume that a refresh rate is changed from 60 Hz (see FIG. 28) to 40 Hz (see FIG. 29) and that the stable pixel writing period (Vgh output period) is determined by counting 811 CK. When the refresh rate is 60 Hz, the stable pixel writing period (Vgh output period) is 16.9 μsec, whereas the gate slope period (Vgh decay period) is 10 μsec (see FIG. 28). On the other hand, when the refresh rate is 40 Hz, the stable pixel writing period (Vgh output period) is 25.3 μsec, whereas the gate slope period (Vgh decay period) is 15 μsec (see FIG. 29). As such, when the refresh rate is changed, the stable pixel writing period (Vgh output period) and the gate slope period (Vgh decay period) are varied, depending on the changing of the refresh rate. Thus, it is not possible to set the stable pixel writing period (Vgh output period) and the gate slope period (Vgh decay period) at the target lengths.

FIG. 30 is a table in which the cases of the refresh rate of 60 Hz and the refresh rate of 40 Hz are compared to each other in terms of a dot clock frequency, a clock counter, an Hsync cycle, a stable pixel writing period (Vgh output period; GS_High period; gate ON width), and a gate slope period (Vgh decay period; GS_Low period; gate slope width). As shown in the table, the stable pixel writing period (Vgh output period) and the gate slope period (Vgh decay period) are determined by counting the dot clock. As such, in the case where the refresh rate is changed, the stable pixel writing period (Vgh output period) and the gate slope period (Vgh decay period) are varied.

The present invention is made in the view of the problem, and an object of the present invention is to provide a display controller, a display device, and a display system, in each of which it is possible to set the stable pixel writing period and/or the gate slope period to a target length.

In order to attain the object, a display controller of the present invention is a controller for controlling a display device including (i) a plurality of pixels, (ii) picture signal lines for supplying data signals to the pixels, (iii) scanning signal lines intersecting the picture signal lines, respectively, and (iv) a scanning signal line driving circuit for driving the scanning signal lines by outputting scanning signals thereto, the display controller including stable pixel writing period determining section that, based on a reference signal independent from a frame rate in the display device, determines a stable pixel writing period out of one horizontal period in the display device, the pixel writing period being a period during which a voltage level outputted from the scanning signal line driving circuit is high.

Furthermore, in order to attain the object, a control method of the present invention for controlling a display device is a control method for controlling a display device including (i) a plurality of pixels, (ii) picture signal lines for supplying data signals to the pixels, (iii) scanning signal lines intersecting the picture signal lines, respectively, and (iv) a scanning signal line driving circuit for driving the scanning signal lines by outputting scanning signals thereto, the control method including determining a stable pixel writing period out of one horizontal period in the display device, based on a reference signal independent from a frame rate in the display device, the stable pixel writing period being a period during which a voltage level outputted from the scanning signal line driving circuit is high.

In the arrangements, the stable pixel writing periods during which the voltage levels are at a high level (Vgh voltage) are determined, based on the reference signal independent from the frame rate. This makes it possible to determine the stable pixel writing period, not depending on the frame rate. Thus, it is possible to set the stable pixel writing period to a target length, regardless of whether and how the frame rate is changed.

It is preferable that in the display controller of the present invention, the stable pixel writing period determining section maintains the thus determined stable pixel writing period even if the frame rate is changed.

In order to attain the object of the present invention, a display controller of the present invention is a display controller for controlling a display device including (i) a plurality of pixels, (ii) picture signal lines for supplying data signals to the pixels, (iii) scanning signal lines intersecting the picture signal lines, respectively, and (iv) a scanning signal line driving circuit for driving the scanning signal lines by outputting scanning signal thereto, the display controller including stable pixel writing period determining section that determines a stable pixel writing period out of one horizontal period in the display device by changing, depending on a frame rate in the display device, a count of a dot clock signal, the stable pixel writing period being a period during which a voltage level outputted from the scanning signal line driving circuit is high.

Furthermore, in order to attain the object, a control method of the present invention for controlling a display device is a control method for controlling a display device including (i) a plurality of pixels, (ii) picture signal lines for supplying data signals to the pixels, (iii) scanning signal lines intersecting the picture signal lines, respectively, and (iv) a scanning signal line driving circuit for driving the scanning signal lines by outputting scanning signals thereto, the method including determining a stable pixel writing period out of one horizontal period in the display device by changing a count of a dot clock signal, depending on a frame rate in the display device, the stable pixel writing period being a period during which a voltage level outputted from the scanning signal line driving circuit is high.

In the arrangement and the method, the stable pixel writing period during which the voltage level is high is determined by changing, depending on the frame rate in the display device, the count of the dot clock signal in the display device. As such, even if the frame rate is changed, it is still possible to arbitrarily control the stable pixel writing period by actively changing the dot clock count according to the changing of the frame rate.

It is preferable that in the control method of the present invention, the thus determined stable pixel writing period be maintained even if the frame rate is changed.

According to the arrangement, the stable pixel writing period determining section maintains the thus determined stable pixel writing period even if the frame rate is changed. This makes it possible to fix the stable pixel writing period even if the frame rate is changed. Thus, it is possible to fix a charging rate with respect to the pixels, thereby securing that a user does not see any defect on a display.

It is preferable that in the display controller of the present invention, the stable pixel writing period determining section vary the stable pixel writing period, depending on a property of the display device.

Also, it is preferable that in the control method of the present invention, the stable pixel writing period be varied, depending on a property of the display device.

In the arrangement, the stable pixel writing period is varied, depending on the property of the display device. Thus, it is possible to set the stable pixel writing period appropriate for the display device.

It is preferable that the display controller of the present invention further include the register associating properties of the display device in advance with stable pixel writing periods to be determined by the stable pixel writing period determining section.

Also, it is preferable that in the control method of the present invention, properties of the display device be associated in advance with stable pixel writing periods to be determined by the control method.

In the arrangement, the register, which associates the properties of the display device with the stable pixel writing periods to be determined by the control method, is further included. This makes it possible to associate the stable pixel writing periods in advance with the properties of the display device by the register. Thus, it is possible to set, in a simple way, the stable pixel writing periods to be determined by the stable pixel writing means.

It is preferable that in the display controller of the present invention, the property of the display device encompass at least a panel size of the display device or resolution in the display device.

Also, it is preferable that in the control method of the present invention, the property of the display device encompass at least a panel size of the display device or resolution in the display device.

It is preferable that a display device of the present invention include control section that is controlled by any of the display controllers.

Also, it is preferable that a display system of the preset invention include any of the display controllers and a display device that is controlled by the display controller.

Furthermore, in order to attain the object, a display controller of the present invention is a display controller for controlling a display device including (i) a plurality of pixels, (ii) picture signal lines for supplying data signals to the pixels, (iii) scanning signal lines intersecting the picture signal lines, respectively, and (iv) a scanning signal line driving circuit for driving the scanning signal lines by outputting scanning signals thereto, the display controller including gate slope period determining section that, based on a reference signal independent from a frame rate in the display device, determines a gate slope period out of one horizontal period in the display device, the gate slope period being a period during which a voltage level outputted from the scanning signal line driving circuit is decreased.

Furthermore, in order to attain the object, a control method of the present invention for controlling a display device is a control method for controlling a display device including (i) a plurality of pixels, (ii) picture signal lines for supplying data signals to the pixels, (iii) scanning signal lines intersecting the picture signal lines, and (iv) a scanning signal line driving circuit for driving the scanning signal lines by outputting scanning signals thereto, the control method including determining a gate slope period out of one horizontal period in the display device, based on a reference signal independent from a frame rate in the display device, the gate slope period being a period during which a voltage level outputted from the scanning signal line driving circuit is decreased.

In the arrangement, the gate slope period during which the voltage level is decreased is determined based on the reference signal independent from the frame rate. This allows the gate slope period to be determined, not depending on the frame rate. Thus, it is possible to set the gate slope period to a target length, regardless of whether and how the frame rate is changed.

Furthermore, in order to attain the object, a display device of the present invention is a display controller for controlling a display device including (i) a plurality of pixels, (ii) picture signal lines for supplying data signals to the pixels, (iii) scanning signal lines intersecting the picture signal lines, respectively, and (iv) a scanning signal line driving circuit for driving the scanning signal lines by outputting scanning signals thereto, the display controller including the gate slope period determining section that determines a gate slope period out of one horizontal period in the display device by changing a count of a dot clock signal, depending on a frame rate in the display device, the gate slope period being a period during which a voltage level outputted from the scanning signal line driving circuit is decreased.

Furthermore, in order to attain the object, a control method of the present invention for controlling a display device is a control method for controlling a display device including (i) a plurality of pixels, (ii) picture signal lines for supplying data signals to the pixels, (iii) scanning signal lines interesting the picture signal lines, respectively, and (iv) a scanning signal line driving circuit for driving the scanning signal lines by outputting scanning signals thereto, the control method including determining a gate slope period out of one horizontal period in the display device by changing a count of a dot clock signal, depending on a frame rate in the display device, the gate slope period being a period during which a voltage level outputted from the scanning signal line driving circuit is decreased.

In the arrangement and the method, the gate slope period during which the voltage level is decreased is determined by changing, depending on the frame rate in the display device, the count of the dot clock signal in the display device. As such, even if the frame rate is changed, it is still possible to arbitrarily set the gate slope period by actively changing the dot clock count according to the changing of the frame rate.

It is preferable that in the display controller of the present invention, the gate slope period determining section maintain the thus determined gate slope period even if the frame rate is changed.

Also, it is preferable that in the control method of the present invention, the thus determined gate slope period be maintained even if the frame rate is changed.

According to the arrangements, it is possible to fix reduction amounts of an in-plane flicker and ΔV, thereby making it possible to prevent generation of the in-plane flicker even if the frame rate if changed.

It is preferable that in the display controller of the present invention, the gate slope period determining section vary the gate slope period, depending on a property of the display device.

Also, it is preferable that in the control method of the present invention, the gate slope period be varied, depending on a property of the display device.

In the arrangements, the gate slope period is varied, depending on the property of the display device. This makes it possible to set the gate slope period appropriate for the property of the display device.

It is preferable that the display controller of the present invention, further include a register associating properties of the display device in advance with stable pixel writing periods to be determined by the stable pixel writing period determining section.

Also, it is preferable that in the control method of the present invention, properties of the display device are associated in advance with gate slope periods to be determined by the control method.

In the arrangements, the register, which associates the properties of the display device with the gate slope periods to be determined by the gate slope period determining section, is further provided. This makes it possible to associate the gate slope periods in advance with the properties of the display device. Thus, it is possible to set, in a simple way, the gate slope periods to be determined by the gate slope determining section.

It is preferable that in the display controller of the present invention, the property of the display device encompass at least a panel size of the display device or resolution in the display device.

Also, it is preferable that in the control method of the present invention, the property of the display device encompass at least a panel size of the display device or resolution in the display device.

In addition, it is preferable that the display device of the present invention include control section that is controlled by any of the display controllers.

Also, it is preferable that a display system of the present invention include any of the display controllers and a display device that is controlled by the display controller.

In order to attain the object, a display controller of the present invention is a display controller for controlling a display device including (i) a plurality of pixels, (ii) picture signal lines for supplying data signals to the pixels, (iii) scanning signal lines intersecting the picture signal lines, respectively, (iv) switching elements provided on intersections of the picture signal lines and the scanning signal lines, and (v) a scanning signal line driving circuit for driving the scanning signal lines by outputting scanning signals thereto, the display controller including: stable pixel writing period determining section that determines a stable pixel period out of one horizontal period, based on a first reference signal independent from a frame rate, the stable pixel writing period being a period during which a voltage level outputted from the scanning signal line driving circuit is high; and gate slope period determining section that determines a gate slope period out of the one horizontal period, based on a second reference signal independent from the frame rate, so that the gate slope period starts at timing when the stable pixel writing period ends, the gate slope period being a period during which the voltage level outputted from the scanning signal line driving circuit is decreased, the one horizontal period also including a switching OFF period during which the voltage level outputted from the scanning signal line driving circuit is low.

Furthermore, in order to attain the object, a control method of the present invention for controlling a display device is a control method for controlling a display device including (i) a plurality of pixels, (ii) picture signal lines for supplying data signal lines to the pixels, (iii) scanning signal lines intersecting the picture signal lines, respectively, (iv) switching elements provided on intersections of the picture signal lines and the scanning signal lines, and (iv) a scanning signal line driving circuit for driving the scanning signal lines by outputting scanning signals thereto, the control method including: determining a stable pixel writing period out of one horizontal period, based on a first reference signal independent from a frame rate, the stable pixel writing period being a period during which a voltage level outputted from the scanning signal line driving circuit is high; determining a gate slope period out of the one horizontal period, based on a second reference signal independent from the frame rate, such that the gate slope period starts at timing when the stable pixel writing period ends, the gate slope period being a period during which the voltage level outputted from the scanning signal line driving circuit is decreased; and turning off the switching elements during a switching OFF period out of the one horizontal period, the switching element turning OFF period being a period during which the voltage level outputted from the scanning signal line driving circuit is low.

In the arrangements, the stable pixel writing period is determined, based on the first reference signal independent from the frame rate, whereas the gate slope period is determined, based on the second reference signal independent from the frame rate, so as to start at the timing when the stable pixel writing period ends. This makes it possible to set the stable pixel writing period and the gate slope period at target lengths, respectively, regardless of whether and how the frame rate is changed. Furthermore, in the invention of the process, the switching elements are turned off during a certain period (a period between the end of the gate slope period and a reset caused by another input of the horizontal synchronization signal) in the one horizontal period, the certain period being neither the stable pixel writing period nor the gate slope period. As such, of the one horizontal period, the stable pixel writing period and the gate slope period are set at the arbitrary lengths, respectively, and the switching elements are forcibly turned off during the rest of the one horizontal period. This makes it possible to set the stable pixel writing period and the gate slope period at target lengths, respectively.

In order to attain the object, a display controller of the present invention is a display controller for controlling a display device including (i) a plurality of pixels, (ii) picture signal lines for supplying data signals to the pixels, (iii) scanning signal lines intersecting the picture signal lines, respectively, (iv) switching elements provided on intersections of the picture signal lines and the scanning signal lines, and (v) a scanning signal line driving circuit for driving the scanning signal lines by outputting scanning signals thereto, the display controller including: stable pixel writing period determining section that determines a stable pixel writing period out of one horizontal period by changing a count of a dot clock signal, depending on a frame rate in the display device, the stable pixel writing period being a period during which a voltage level outputted from the scanning signal line driving circuit is high; and gate slope determining section that determines a gate slope period out of the one horizontal period by changing the count of the dot clock signal, depending on the frame rate in the display device, such that the gate slope period starts at timing when the stable pixel writing period ends, the gate slope period being a period during which the voltage level outputted from the scanning signal driving circuit is decreased, the one horizontal period also including a switching element OFF period during which the voltage level outputted from the scanning signal line driving circuit is low.

Furthermore, a control method of the present invention for controlling a display device is a control method for controlling a display device including (i) a plurality of pixels, (ii) picture signal lines for supplying data signals to the pixels, (iii) scanning signal lines intersecting the picture signal lines, respectively, (iv) switching elements provided on intersections of the picture signal lines and the scanning signal lines, and (v) a scanning signal line driving circuit for driving the scanning signal lines by outputting scanning signals thereto, the control method including: determining a stable pixel writing period out of one horizontal period by changing a count of a dot clock signal, depending on a frame rate in the display device, the stable pixel writing period being a period during which a voltage level outputted from the scanning signal line driving circuit is high; determining a gate slope period out of the one horizontal period by changing the count of the dot clock signal, depending on the frame rate in the display device, such that the gate slope period starts at timing when the stable pixel writing period ends, the gate slope period being a period during which the voltage level outputted from the scanning signal line driving circuit is decreased; and turning off the switching elements during a switching element turning OFF period out of the one horizontal period, the switching element turning OFF period being a period during which the voltage level outputted from the scanning signal line driving circuit is low.

In the arrangement and method, the stable pixel writing period and the gate slope period are determined by changing, depending on the frame rate in the display device, the count of the dot clock signal in the display device. As such, even if the frame rate is changed, it is still possible to arbitrarily set the stable pixel writing period and the gate slope period by actively changing the dot clock count according to the changing of the frame rate.

It is preferable that in the display controller of the present invention, the stable pixel writing period determining section maintain the thus determined stable pixel writing period even if the frame rate is changed.

Also, it is preferable that in the control method of the present invention, the thus determined stable pixel writing period be maintained even if the frame rate is changed.

In the arrangements, the stable pixel writing period determining section maintains the determined stable pixel writing period even if the frame rate is changed. This makes it possible to fix the stable pixel writing period even if the frame rate is changed. Thus, it is possible to fix the charging rate with respect to the pixels, thereby securing that a user does not see any defect on a display.

It is preferable that in the display controller of the present invention, the gate slope period determining section maintains the thus determined gate slope period even if the frame rate is changed.

Also, it is preferable that in the control method of the present invention, the thus determined gate slope period be maintained even if the frame rate is changed.

According to the arrangements, it is possible to fix the reduction amounts of the in-plane flicker and the $\Delta V$, thereby making it possible to prevent the generation of the flicker even if the frame rate is changed.

It is preferable that in the display controller of the present invention, the stable pixel writing period determining section varies the stable pixel writing period, depending on a property of the display device.

Also, it is preferable that in the control method of the present invention, the stable pixel writing period be varied, depending on a property of the display device.

In the arrangements, the stable pixel writing period is varied, depending on the property of the display device. This makes it possible to set the stable pixel writing period appropriate for each display device.

It is preferable that in the display controller of the present invention, the gate slope period determining section varies the gate slope period, depending on a property of the display device.

Also, it is preferable that in the control method of the present invention, the gate slope period be varied, depending on a property of the display device.

In the arrangements, the gate slope period is varied, depending on the property of the display device. This makes it possible to set the gate slope period appropriate for each display device.

It is preferable that the display controller of the present invention further include a register associating properties of the display device in advance with stable pixel writing periods to be determined by the stable pixel writing period determining section.

Also, it is preferable that in the control method of the present invention, properties of the display device be associated in advance with stable pixel writing periods to be determined by the control method.

In the arrangements, the register, which associates the properties of the display device with the stable pixel writing periods to be determined by the stable pixel writing period determining section, is further included. This makes it possible to associate the stable pixel writing periods in advance with the properties of the display device by the register. Thus, it is possible to set, in a simple way, the stable pixel writing periods to be determined by the stable pixel period determining section.

It is preferable that the display controller of the present invention further include a register associating properties of the display device in advance with gate slope periods to be determined by the gate slope period determining section.

Also, it is preferable that in the control method of the present invention, properties of the display device be associated in advance with gate slope periods to be determined by the control method.

In the arrangements, the register, which associates the properties of the display device with the gate slope periods to be determined by the gate slope period determining section, is further included. This makes it possible to associate the gate slope periods in advance with the properties of the display device by the register. Thus, it is possible to readily set the gate slope periods to be determined by the gate slope period determining section.

It is preferable that in the display controller of the present invention, the property of the display device encompass at least a panel size of the display device or resolution in the display device.

Also, it is preferable that in the control method of the present invention, the property of the display device encompass at least a panel size of the display device or resolution in the display device.

It is preferable that the display device of the present invention include control section that is controlled by any of the display controllers.

Also, it is preferable that the display system of the present invention includes any of the display controllers above and a display device that is controlled by the display controller.

For a fuller understanding of the nature and advantages of the invention, reference should be made to the ensuing detailed description taken in conjunction with the accompanying drawings.

BRIEF DESCRIPTION OF DRAWINGS

FIG. 5 is a table in which cases of the refresh rate of 60 Hz and the refresh rate of 40 Hz are compared to each other in terms of a dot clock frequency, a clock counter, a horizontal synchronization signal cycle, a GOE signal_High width, and a TGON period (pixel stably writing period), in Embodiment 1.

FIG. 6 is a table in which TGON periods (pixel stably writing periods) are associated with settings of a register, respectively, Embodiment 1.

FIG. 9 is a table in which cases of the refresh rate of 60 Hz and the refresh rate of 40 Hz are compared to each other in terms of a dot clock frequency, a clock counter, a horizontal synchronization signal frequency, a GOE signal_High width, and a TGON period (pixel writing period), in the comparative example of Embodiment 1.

FIG. 15 is a table in which cases of the refresh rate of 60 Hz and the refresh rate of 40 Hz are compared to each other in terms of a dot clock frequency, a clock counter, the Hsync frequency, a high level period (GS_High period; pixel writing period) of a gate slope signal, and a low level period (GS_Low width; gate slope period) of a gate slope signal, in Embodiment 2.

FIG. 16 is a table in which low level periods (GSL period; gate slope periods) of a gate slope signal are associated with settings of a register, respectively, in Embodiment 2.

FIG. 22 is a table in which cases of the refresh rate of 60 Hz and the refresh rate of 40 Hz are compared to each other in terms of a dot clock frequency, a clock counter, the horizontal synchronization signal (Hsync), a G_ON signal_High width (stable pixel writing period), a GS' signal_High width (gate slope period), and a GOE signal_Low width (gate OFF period), in Embodiment 3.

FIG. 30 is a table in which cases of the refresh rate of 60 Hz and the refresh rate of 40 Hz are compared to each other in terms of a dot clock frequency, a clock counter, an Hsync frequency, a high level period (GS_High period; pixel writing period) of a gate slope signal, and a low level period (GS_Low width; gate slope period) of the gate slope signal, in the conventional technique.

BRIEF DESCRIPTION OF REFERENCE NUMERALS

1. Display device (liquid crystal display device)
2. Graphic LSl (display controller)
3. Control circuit (control section)
4. Scanning signal line driving circuit
8. TFT (switching element)

33. First gate slope period determination circuit
53. Second stable pixel writing period determination circuit
54. Second gate slope period determination circuit
70. First stable pixel writing period determination circuit
S(1) through S(N). Source bus lines (video signal lines)
G(1) through G(M). Gate bus lines (scanning signal lines)
Hsync. Horizontal synchronization signal

BEST MODE FOR CARRYING OUT THE INVENTION

Embodiment 1

A; Embodiment in which "a Stable Pixel Writing Period" is Fixed

One embodiment of the present invention is described below with reference to the attached drawings.

Figure 1:
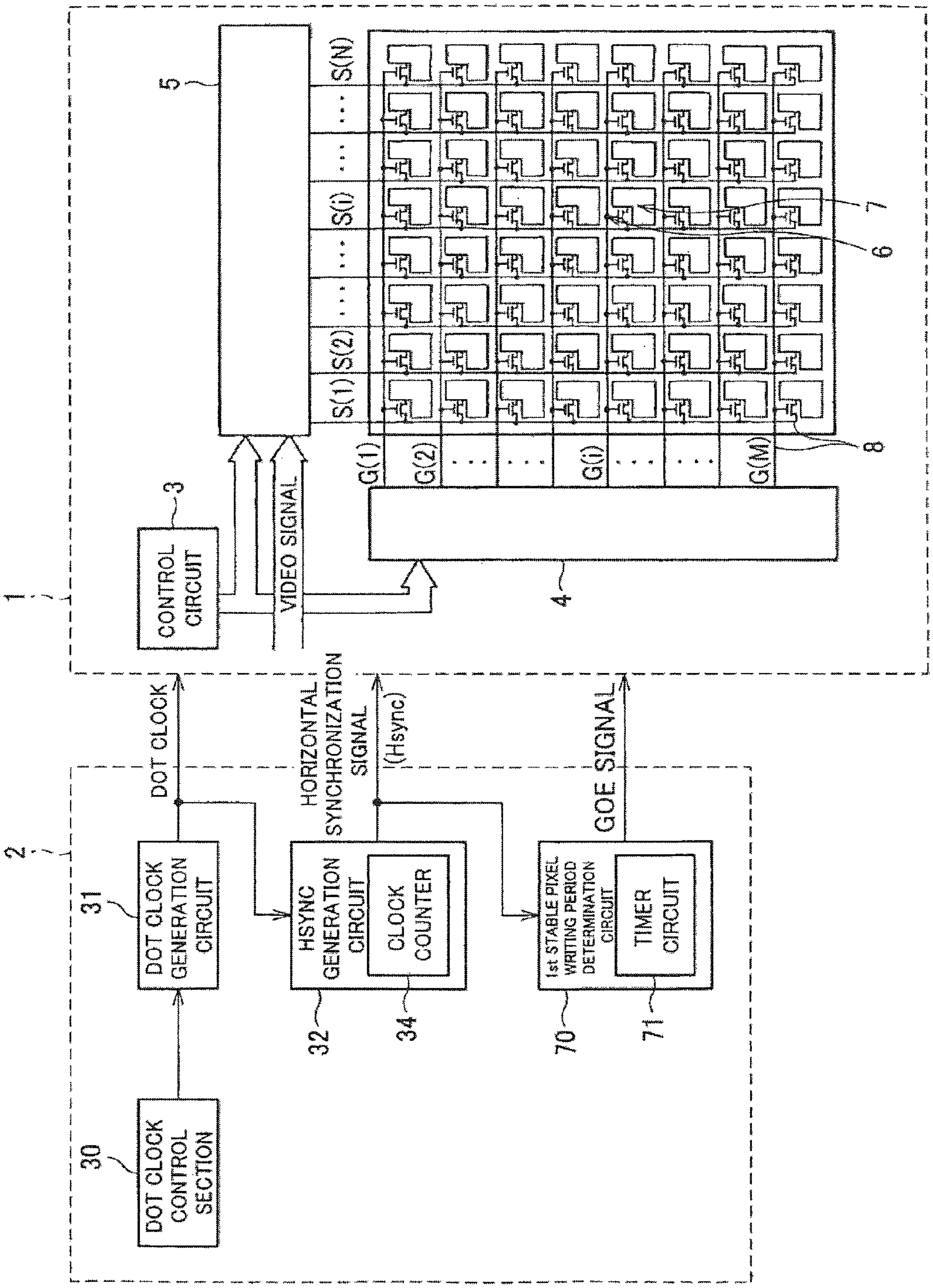
FIG. 1 is a block diagram showing a display system of Embodiment 1.

As shown in FIG. 1, a display system of the present embodiment includes a liquid crystal display device (display device; LCD) 1 and a graphic LSl (display controller) 2 provided so as to precede the liquid crystal display device 1.

(Display Device)

The display device 1 includes a logic controller (control circuit; control section) 3, a scanning signal line driving circuit (gate driver) 4, a data signal line driving circuit (source driver) 5, and a display section 6.

The display section 6 includes a plurality of source bus lines (video signal lines) S(1) through S(N) and a plurality of gate bus lines (scanning signal lines) G(1) through G(N). The source bus lines S(1) through S(N) are connected to the data signal line driving circuit into which a video signal is supplied, whereas the gate bus lines G(1) through G(N) are connected to the scanning signal line driving circuit. In the display section 6, the source bus lines and the gate bus lines are provided in a matrix manner, and on intersections thereof, switching elements are provided. A switching element is formed of a component such as a TFT 8 which is connected to a picture electrode 7. The TFT 8 is turned on by a voltage Vgh and turned off by Vgl, the voltage Vgh and Vgl being applied to a gate bus line connected to the TFT 8.

The control circuit 3 serves as a control section of the display device 1 and receives signals such as a dot CK (dot clock), a horizontal synchronization signal (Hsync), and a GOE signal (detailed explanation of the GOE signal is later provided) from a graphic LSl 2. The control circuit 3 generates various types of control signals, based on the dot CK, the horizontal synchronization signal, and the GOE signal supplied from the graphic LSl 2, and then provides the thus generated control signals to a gate driver 4 and a source driver 5. The control signals supplied from the control circuit 3 to the gate driver 4 encompass signals such as a gate slope signal, a gate start pulse (GSP), a gate clock (GCK), and a latch signal.

Figure 2:
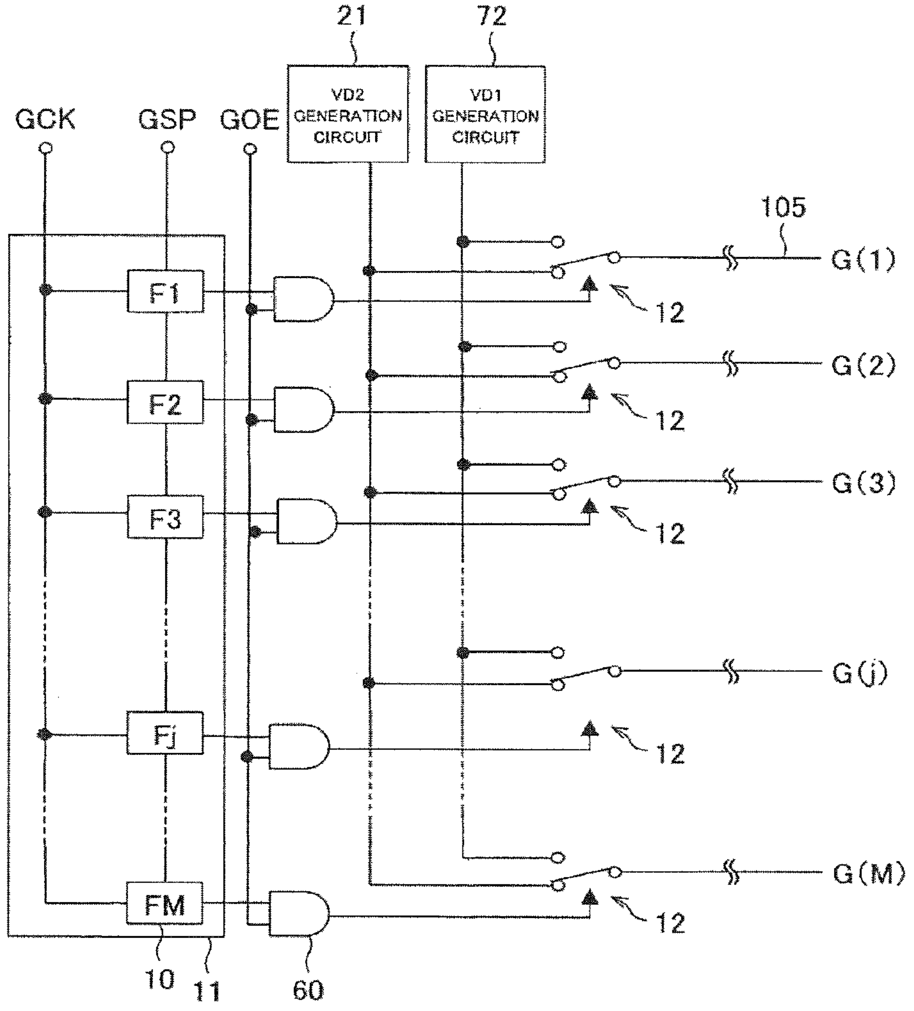
FIG. 2 is a circuit diagram showing an internal configuration of a scanning signal line driving circuit of Embodiment 1.

As shown in FIG. 2, the gate driver 4 includes (i) a shift resistor section 11 which includes M numbers of flip-flops (F1 through FM) 10 being connected to each other by a cascade connection, (ii) a plurality of AND gates 60 for receiving outputs of the flip-flops 10 and GOE signals, (iii) a plurality of selection switches 12 that are switched by outputs of the AND gates 60, respectively, (iv) a VD1 generation circuit 72 for generating an input signal supplied to one input terminal of a selection switch 12, and (v) a VD2 generation circuit 21 for generating an input signal supplied to the other input terminal of the selection switch 12. A common terminal of the selection switch 12 is connected to each of the gate bus lines G(1) through G(M), the gate bus lines G(1) though G(M) corresponding to selection switches 12, respectively.

The VD 2 generation circuit 21 generates a gate OFF voltage Vgl, which is at a sufficient level to turn off the TFT 8 provided in the display section 6.

The VD 1 generation circuit 72 generates a gate ON voltage Vgh, which is at a sufficient level to turn on the TFT 8 provided in the display section 6.

Next, the following description provides explanations of the most important parts of the present invention, i.e., a configuration of the graphic LSl 2 and the GOE signal.

As shown in FIG. 1, the graphic LSl 2 includes (i) a dot clock control section 30, (ii) a dot clock generation circuit 31, (iii) a horizontal synchronization signal generation circuit 32, and (iv) a first stable pixel writing period determination circuit 70.

The horizontal synchronization generation circuit 32 includes a clock counter 34 for counting a dot clock, whereas the first stable pixel writing period determination circuit 70 includes a timer circuit 71.

The dot clock control section 30 determines the dot clock in accordance with a target refresh rate (frame rate), and supplies to the dot clock generation circuit 31, an instruction signal for the thus determined doc clock.

The dot clock generation circuit 31 receives the instruction signal from the dot clock control section 30, and then generates the dot clock. As such, the dot clock in the present embodiment can be varied, depending on the refresh rate. This makes it possible, for example, that a low refresh rate (40 Hz) is used in a case where a low power consumption is desired to be realized, whereas a normal refresh rate (60 Hz) is used in cases other than the above. The dot clock generation circuit 31 further supplies the generated dot clock to the control circuit 3 of the display device 1 and to the horizontal synchronization generation circuit 32 of the graphic LSl 2.

The horizontal synchronization signal generation circuit 32 receives the dot clock from the dot clock generation circuit 31. Subsequently, the clock counter 34 counts the dot clock for fixed times. Then, the horizontal synchronization signal generation circuit 32 generates a horizontal synchronization signal. Also, the horizontal synchronization signal generation circuit 32 supplies the thus generated horizontal synchronization signal to the control circuit 3 of the display device 1 and to the first stable pixel writing period determination circuit 70 of the graphic LSl 2.

As described above, the first stable pixel writing period determination circuit 70 includes the timer circuit 71. The timer circuit 71 measures time, based on a reference clock different from the dot clock, and determines a stable pixel writing period (GOE signal_High width). Then, the stable pixel writing period determination circuit 70 generates a GOE signal. In the present specification, the stable pixel writing period is a period during which the gate bus driver 4 outputs scanning on voltages at a sufficient level (high level) to turn on the TFTs 8 on the gate bus lines (scanning signal lines) G(1) through G(M) within one scanning period.

Further, the first stable pixel writing period determination circuit 70 receives the horizontal synchronization signal that serves as a reset signal to the GOE signal. As such, the GOE signal has the same cycle as the horizontal synchronization signal.

According to a conventional technique, a stable pixel writing period (GOE signal_High width) and a gate OFF period (GOE signal_Low width) are set, based on a dot clock, i.e., the stable pixel writing period and the gate OFF period are set by counting the dot clock. In a case where the refresh rate is changed, the dot clock is varied. Thus, the stable pixel writing period (GOE signal_High width) and the gate OFF period (GOE signal_Low width) are changed, depending on the changing of the refresh rate.

In contrast, in the first stable pixel writing period determination circuit 70 of the present embodiment, the stable pixel writing period (GOE signal_High width) is fixed, regardless of whether and how the refresh rate is changed. The following description provides an explanation of a specific method for realizing the first stable pixel writing period determination circuit 70.

In the first stable pixel writing period determination circuit 70, the timer circuit 71 measures a time period for the stable pixel writing period (GOE signal_High width), with the horizontal synchronization signal being used as the reset signal (as a trigger). As such, upon receiving the horizontal synchronization signal, the timer circuit 71 starts measuring the time period for the stable pixel writing period. After the timer circuit 71 finishes the measurement, the GOE signal is changed to a low level. This forcibly turns off the TFTs 8. Thus, regardless of whether and how the refresh rate is changed, the stable pixel writing period (GOE signal_High width) can be fixed.

Figure 3:
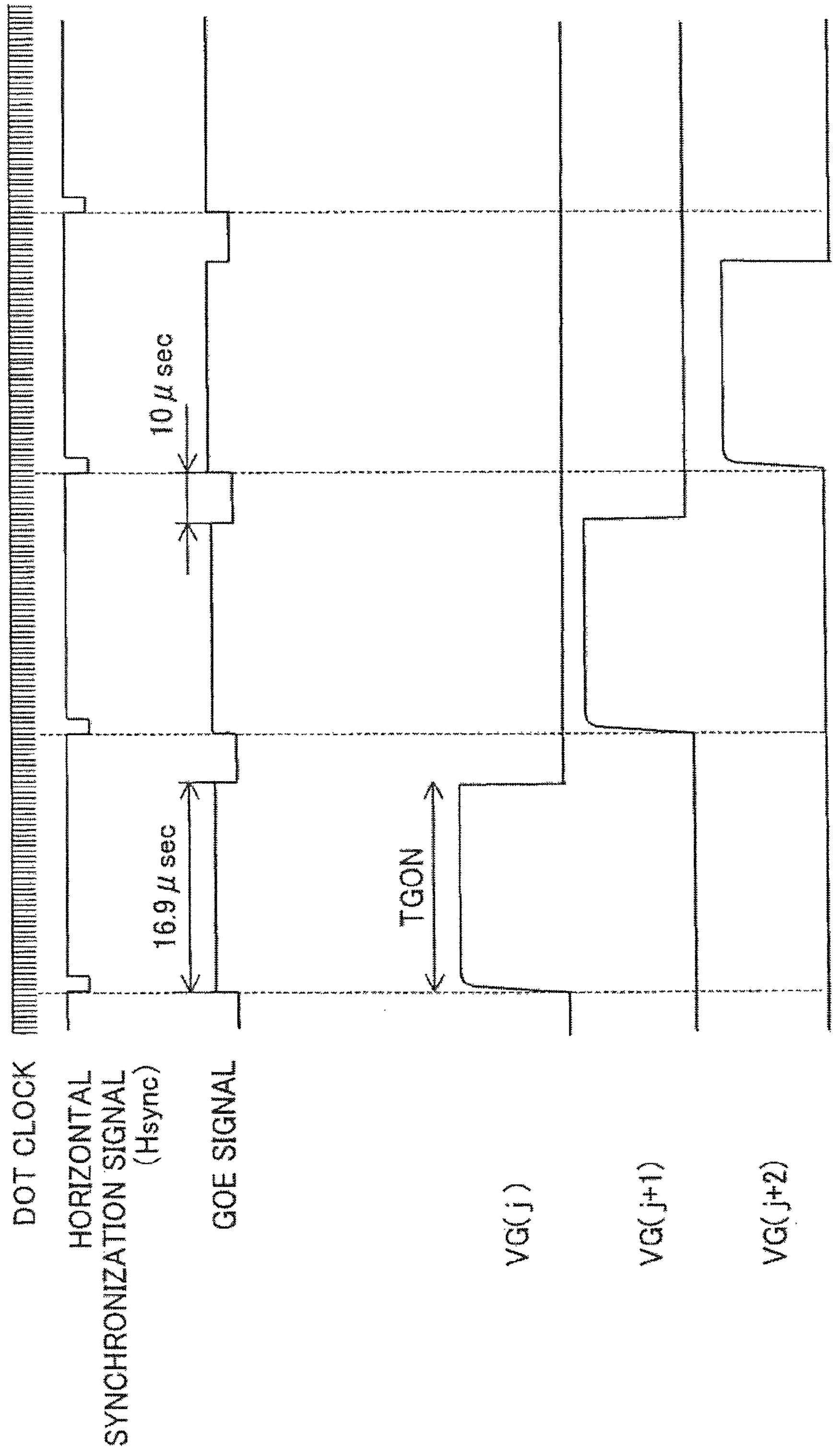
FIG. 3 is a timing chart showing a dot clock, a horizontal synchronization signal (Hsync), a GOE signal, VG (j), VG (j+1), and VG (j+2), each occurred when a refresh rate is 60 Hz, in Embodiment 1.
Figure 4:
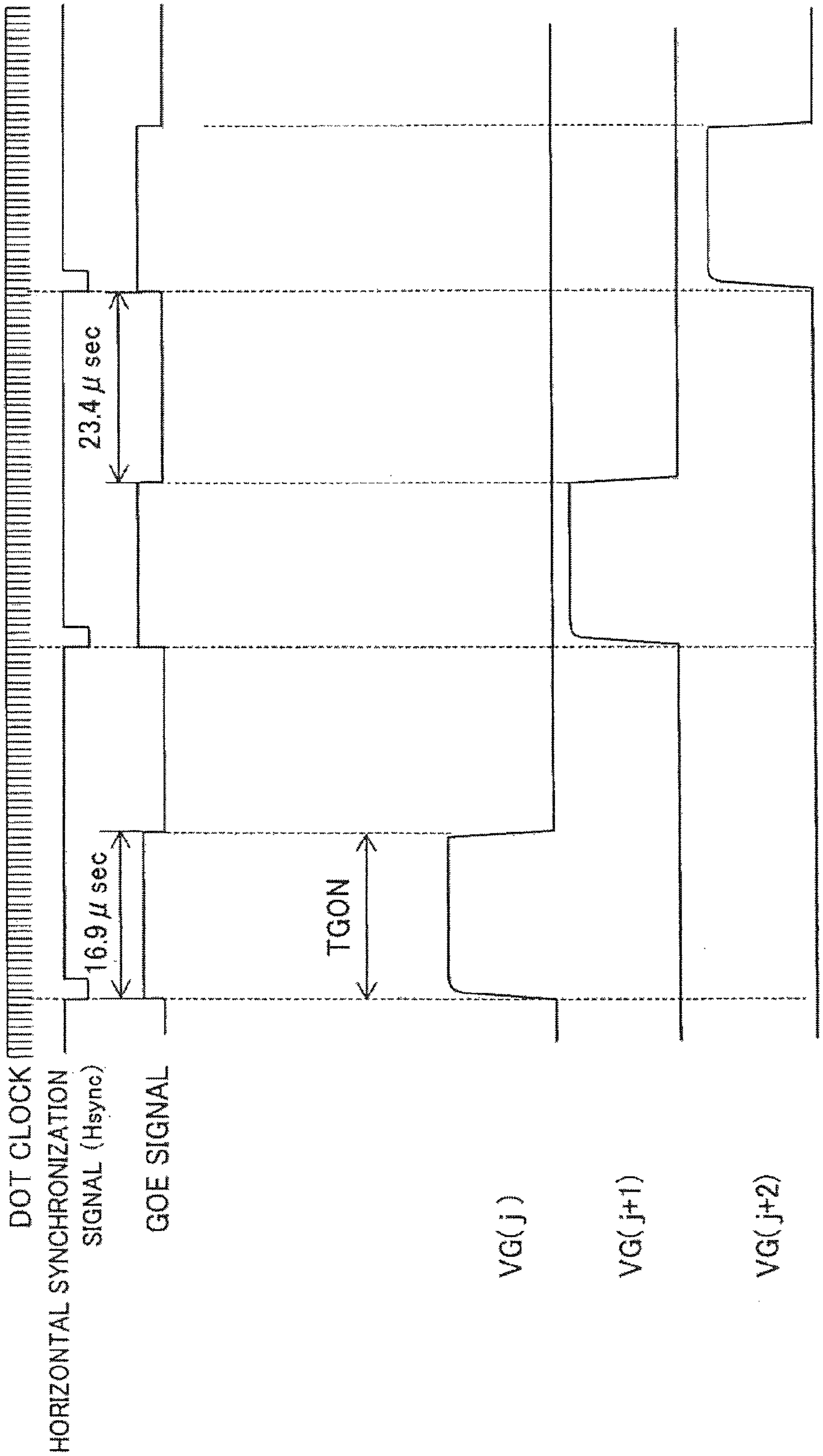
FIG. 4 is a timing chart showing a dot clock, a horizontal synchronization signal (Hsync), a GOE signal, VG (j), VG (j+1), and VG (j+2), each occurred when the refresh rate is 40 Hz, in Embodiment 1.

For example, FIG. 3 is a timing chart showing a dot clock, a horizontal synchronization signal (Hsync), a GOE signal, VG(j), VG(j+1), and VG(j+2), each occurred in a case where the refresh rate is 60 Hz. On the other hand, FIG. 4 is a timing chart showing a dot clock, a horizontal synchronization signal (Hsync), a GOE signal, VG(j), VG(j+1), and VG(j+2), each occurred in a case where the refresh rate is 40 Hz. In the present embodiment, even if the refresh rate is changed from 60 Hz (see FIG. 3) to 40 Hz (see FIG. 4), the stable pixel writing period is measured, based on the reference clock instead of the dot clock, the reference clock being different from the dot clock and provided in the timer circuit 71 of the first stable pixel writing period determination circuit 70.

More specifically, even if the refresh rate is changed form 60 Hz to 40 Hz, the stable pixel writing period is not varied. In the case where the refresh rate is 60 Hz, the stable pixel writing period is 16.9 μsec. As shown in FIG. 4, upon receiving the horizontal synchronization signal, the timer circuit 71 starts measuring the time period for the stable pixel writing period. When 16.9 μsec passes after the timer circuit 71 starts the measurement, the GOE signal is switched from the high level to the low level. The GOE signal is then switched from the low level to the high level when the horizontal signal is inputted another time. After this, the same operations are repeated. This makes it possible to fix the stable pixel writing period (GOE signal_High width). Thus, regardless of whether and how the refresh rate is changed, the stable pixel writing period can be fixed.

FIG. 5 is a table in which the cases of the fresh rate of 60 Hz and the fresh rate of 40 Hz are compared to each other in terms of a dot clock, a clock counter, a horizontal synchronization signal cycle, a GOE signal_High width, and a TGON period (stable pixel writing periods). In particular, as is clear from the comparison of the cases in terms of the TGON period (stable pixel writing period), the TGON periods can be fixed between the cases of the refresh rate of 60 Hz and the refresh rate of 40 Hz.

The present embodiment is not limited to this arrangement. Alternatively, in the present embodiment, it is possible to set a stable pixel writing period (GOE signal_High width) arbitrarily, depending on a panel size of a display device and/or resolution in the display device, i.e., depending on a property of the display device. The following description deals with the arrangement.

The following description raises examples of display devices A and B, having properties different from each other, so as to provide an explanation of the arrangement.

In a first stable pixel writing period determination circuit 70, the stable pixel writing period (GOE signal_High width) can also be determined, in addition to being determined in the arrangement described earlier, depending on a setting of a register.

For the sake of easy understanding, the following description uses a table as shown in FIG. 6 in which settings of the resister and TGON periods (stable pixel writing periods) are associated with each other.

In a table shown in FIG. 6, the settings of the resister and the TGON periods are associated with each other, respectively. As such, as shown in FIG. 6, a TGON period is 10 μsec in a case where a setting of the resister is (0, 0); the TGON period is 15 μsec in a case where the setting of the resister is (0, 1); the TGON period is 20 μsec in a case where the setting of the resister is (1, 0); and the TGON period is 25 μsec in a case where the setting of the resister is (1, 1).

The first stable pixel writing period determination circuit 70 of a graphic LSI 2 receives from a display device 1, a signal corresponding to a property of the display device 1. For convenience, the signal is referred to as a register setting signal hereinafter. The register setting signal is a signal for setting a register. Depending on the setting of the register, the stable pixel writing period (GOE signal_High width) is determined. For example, in the case of the display device A, the setting (0, 0) of the register is selected in accordance with a register setting signal, thereby causing a stable pixel writing period (GOE signal_High width) to be set at 10 μsec (see FIG. 6). On the other hand, in the case of the display device B, the setting (1, 0) of the register is selected in accordance with a register setting signal, thereby causing a stable pixel writing period to be set at 15 μsec (see FIG. 6). As such, it is possible to set a stable pixel writing period (GOE signal_High width), depending on a property of a display device. This makes it possible to fix the stable pixel writing period, as in the arrangement described earlier, regardless of whether and how a refresh rate is changed. The register setting signal may or mat not be supplied in conjunction with an instruction signal outputted from a dot clock control section 30.

It is preferable that a timer clock signal be used in a reference signal as described earlier. Also, the reference signal for the control may be a reference CLK of a component such as a system CPU, instead of the dot clock for the display device.

The present embodiment is not limited to the arrangement. Alternatively, in the present embodiment, it is also possible to actively set the dot clock count, depending on the changing of the frame rate. This makes it possible to set the stable pixel writing period at a fixed or predetermined length even if the refresh rate is changed. As such, even if the dot clock frequency for the display is changed while the frame rate is being changed, it is still possible to carry out control by changing a CLK count.

A Comparative Example of Embodiment 1

The following description deals with a comparative example of Embodiment 1.

Figure 7:
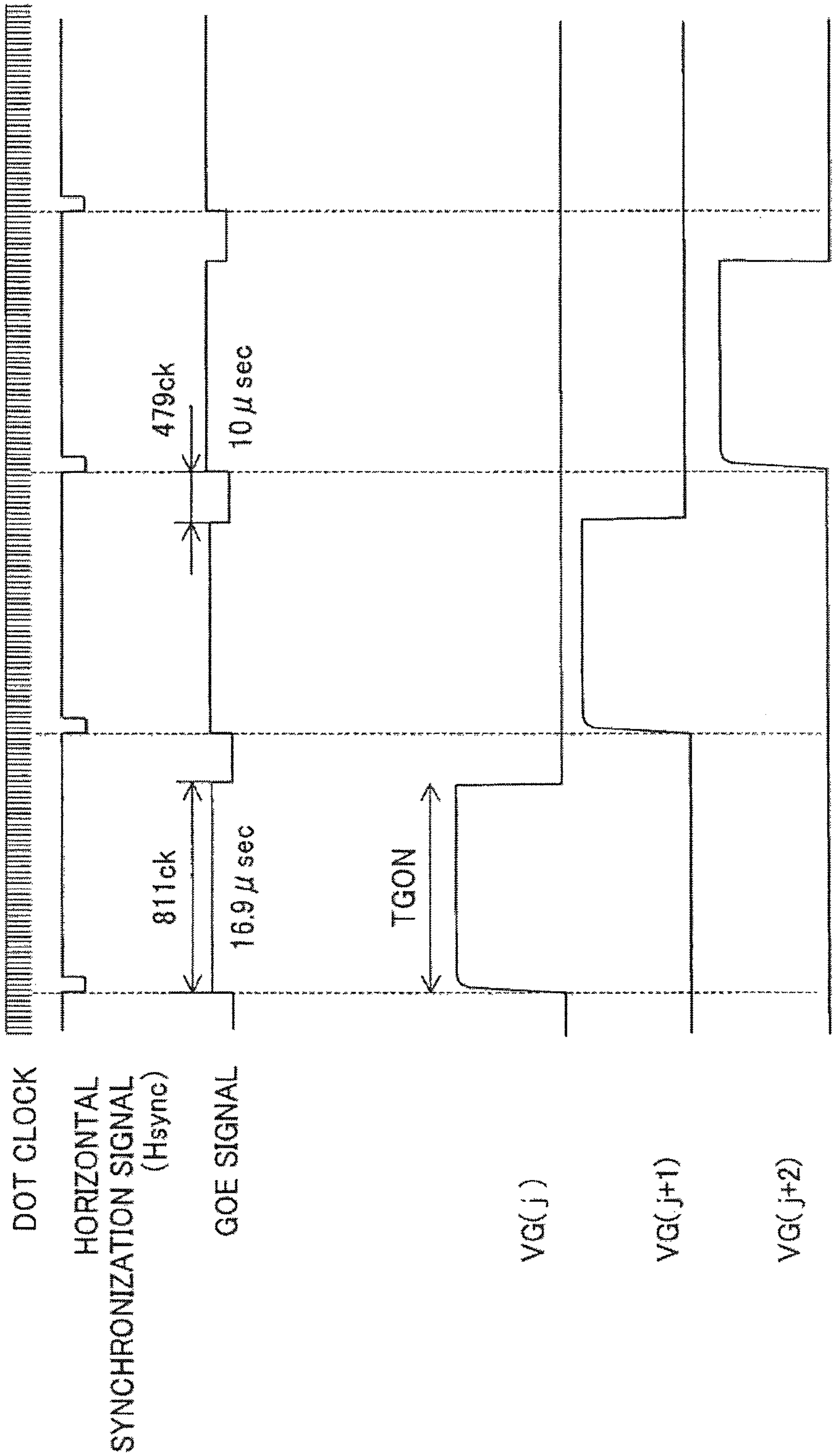
FIG. 7 is a timing chart showing a dot clock, a horizontal synchronization signal (Hsync), a GOE signal, VG (j), VG (j+1), and VG (j+2), each occurred when a refresh rate is 60 Hz, in a comparative example of Embodiment 1.
Figure 8:
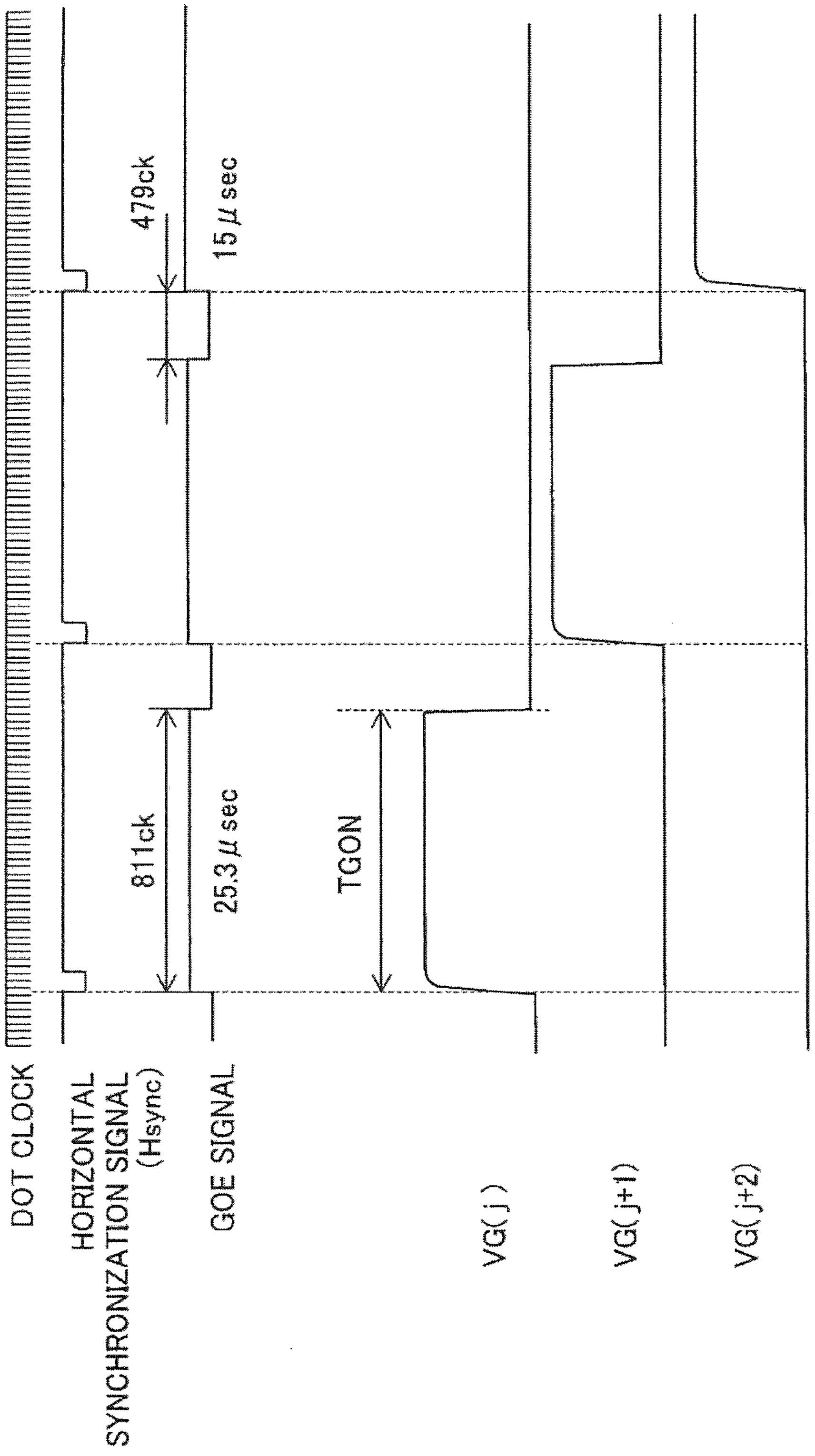
FIG. 8 is a timing chart showing a dot clock, a horizontal synchronization signal (Hsync), a GOE signal, VG (j), VG (j+1), and VG (j+2), each occurred when a refresh rate is 40 Hz, in the comparative example of Embodiment 1.

FIG. 7 is a timing chart from a comparative example of the present embodiment shown in FIG. 3. FIG. 8 is a timing chart from the comparative example of the present embodiment shown in FIG. 4. In the comparative example, a TGON period was measured by counting the dot clock, as shown in FIG. 7. In this case, the number of the dot clock counts was 811 clocks (CK). Also, in the case where the refresh rate is changed from 60 Hz to 40 Hz, the TGON period was measured by counting 811 clocks (CK).

As such, in the case where the refresh rate was 60 Hz, the TGON period was equal to 16.9 μsec (see FIG. 7), whereas in the case where the refresh rate was 40 Hz, the TGON period was equal to 25.3 μsec (see FIG. 8). Thus, the TGON period varied, depending on the fresh rate. This caused a problem that it was neither possible to control nor to fix the TGON period.

FIG. 9 is a table of the comparative example of the present embodiment shown in FIG. 5. In the comparative example, the TGON period was measured by counting the clock (see the table in FIG. 9). This caused the problem that the TGON period is varied, depending on the refresh rate (see the table in FIG. 9).

Embodiment 2

B; Embodiment in which "Gate Slope Period" is Fixed

Another embodiment of the present invention is described below with reference to the attached drawings. The present embodiment explains a difference between the present embodiment and Embodiment 1. For an easy explanation, members having the same functions as those described in Embodiment 1 are given the same reference numerals, and explanations thereof are omitted. In Embodiment 1, a stable pixel writing period is controlled. In contrast, the present embodiment explains an arrangement in which (i) a gate slope period is provided, and (ii) the gate slope period is controlled.

In the present specification, the gate slope period is a period during which a voltage level is decreased in a slopewise manner (or decreased in a stepwise manner).

Figure 10:
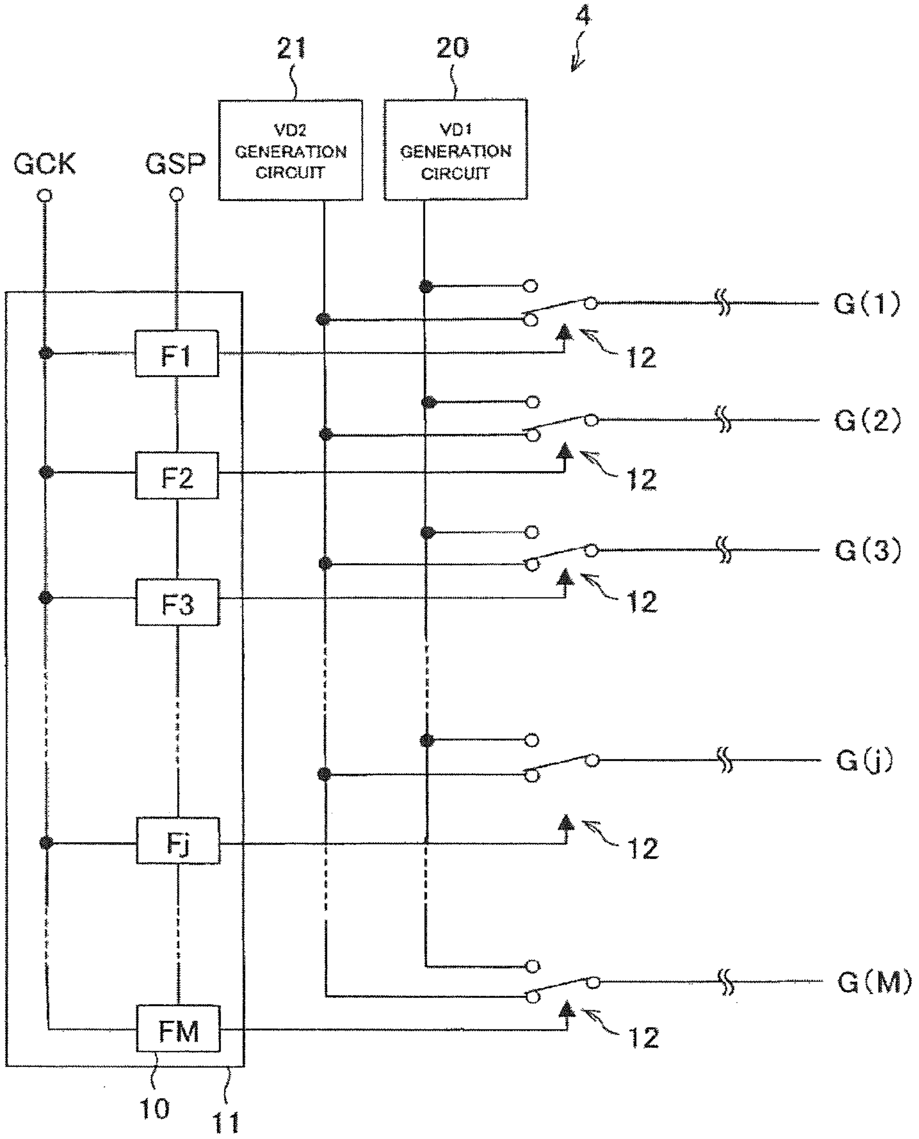
FIG. 10 is a circuit diagram showing an internal configuration of a scanning signal line driving circuit of Embodiment 2.

As shown in FIG. 10, a source driver 4 of the present embodiment includes (i) a shift register section 11 which includes M numbers of flip-flops (F1 through FM) being connected to each other by a cascade connection, (ii) a plurality of selection switches 12 that are switched by outputs from the flip flops 10, respectively, (iii) a VD1 generation circuit 20 for generating a signal supplied to one input terminal of a selection switch 12, and (iv) a VD2 generation circuit 21 for generating a signal supplied to the other input terminal of the selection switch 12. A common terminal of the selection switch 12 is connected to each of gate bus lines G(1) through G(M), the gate bus lines corresponding to selection switches 12. As such, the source driver 4 of the present embodiment differs from a source driver 4 of Embodiment 1 in that it does not include any AND gate 60.

Figure 11:
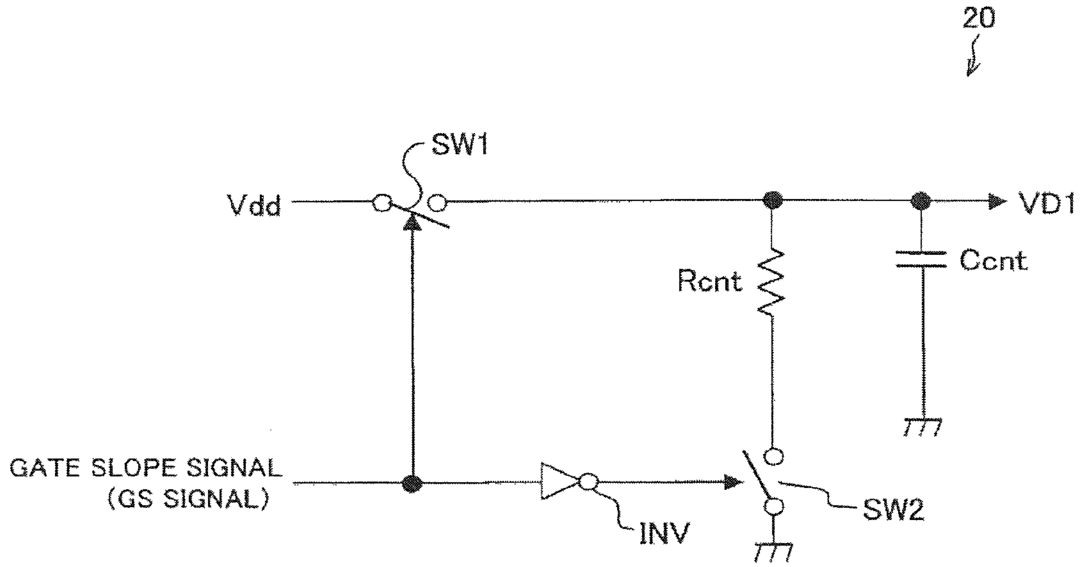
FIG. 11 is a circuit diagram showing an internal configuration of a VD1 generation circuit shown in FIG. 10.

As shown in FIG. 11, the VD1 generation circuit 20 of the present embodiment includes (i) a capacitor Ccnt and a resistor Rcnt that carry out an electric charge and discharge, respectively, (ii) an inverter INV for controlling the electric charging and discharging, and (iii) switches SW1 and SW2 for switching between the electric charge and discharge.

The switch SW1 has one input terminal via which a signal voltage Vdd is applied. The signal voltage Vdd is a direct voltage having a Vgh voltage at a sufficient level to turn on a TFT 8. The switch SW1 has the other input terminal which is connected to one end of the resistor Rcnt as well as to one end of the capacitor Ccnt. The other end of the resistor Rcnt is connected to a ground via the switch SW2. The switch SW2 is opened and closed in accordance with a gate slope signal inputted via the inverter INV.

The gate slope signal, which has the same cycle as a horizontal synchronization signal (later described), controls the switch SW1 to open and close. Also, the switch SW2 is opened and closed in accordance with the gate slope signal that is supplied via the inverter INV.

More specifically, in a case where the gate slope signal is at a high level (in a case of a stable pixel writing period), the switch SW1 is closed, whereas the switch SW2 receives a gate slope signal of a low level via the inverter INV, and is opened in response to the gate slope signal. As such, the Vgh voltage is applied, as a VD1 signal, to one input terminal of the switch SW, and the capacitor Ccnt is charged with the Vgh voltage.

Figure 13:
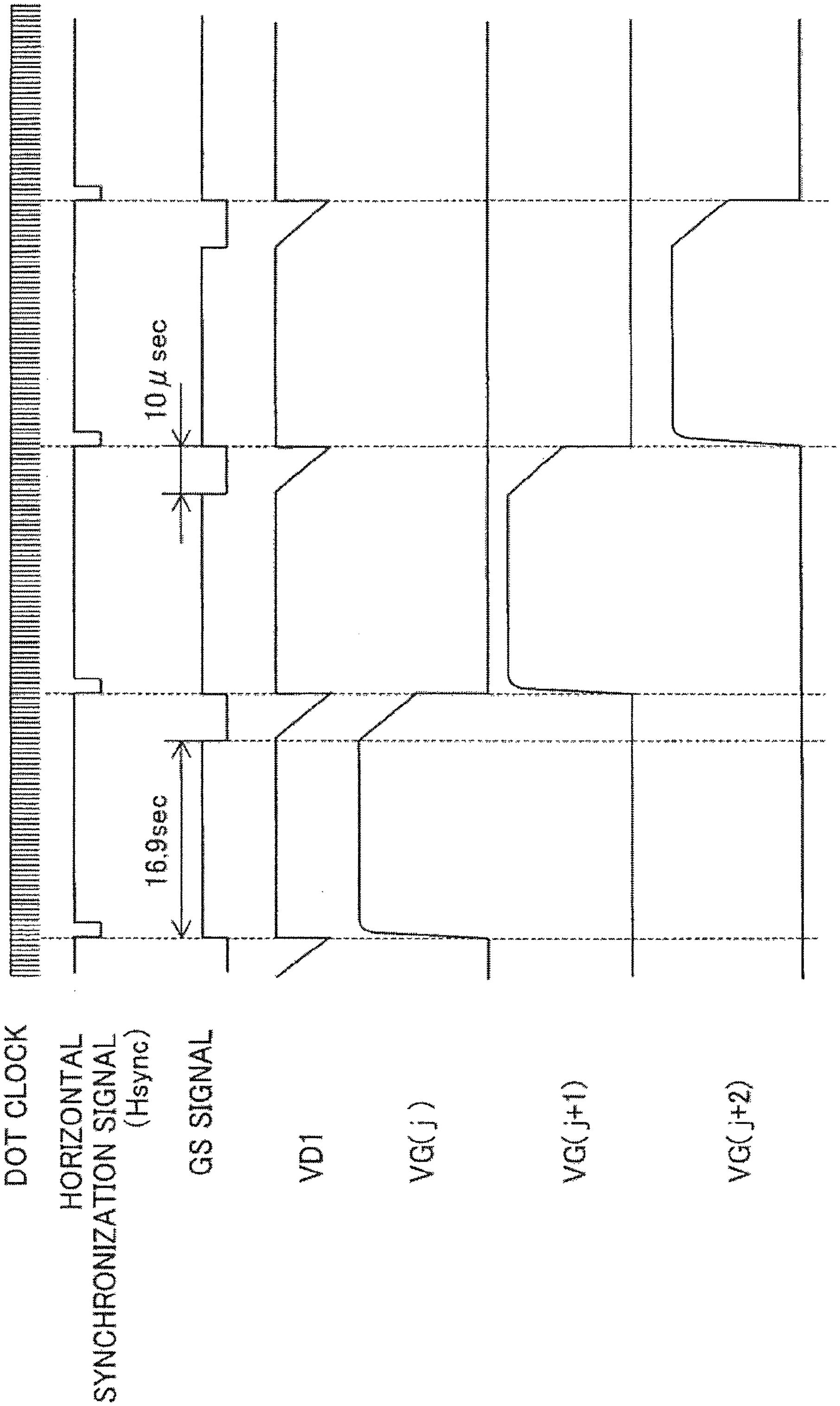
FIG. 13 is a timing chart showing a dot clock, a horizontal synchronization signal (Hsync), a GS signal, VD1, VG (j), VG (j+1), and VG (j+2), each occurred when a refresh rate is 60 Hz, in Embodiment 2.
Figure 14:
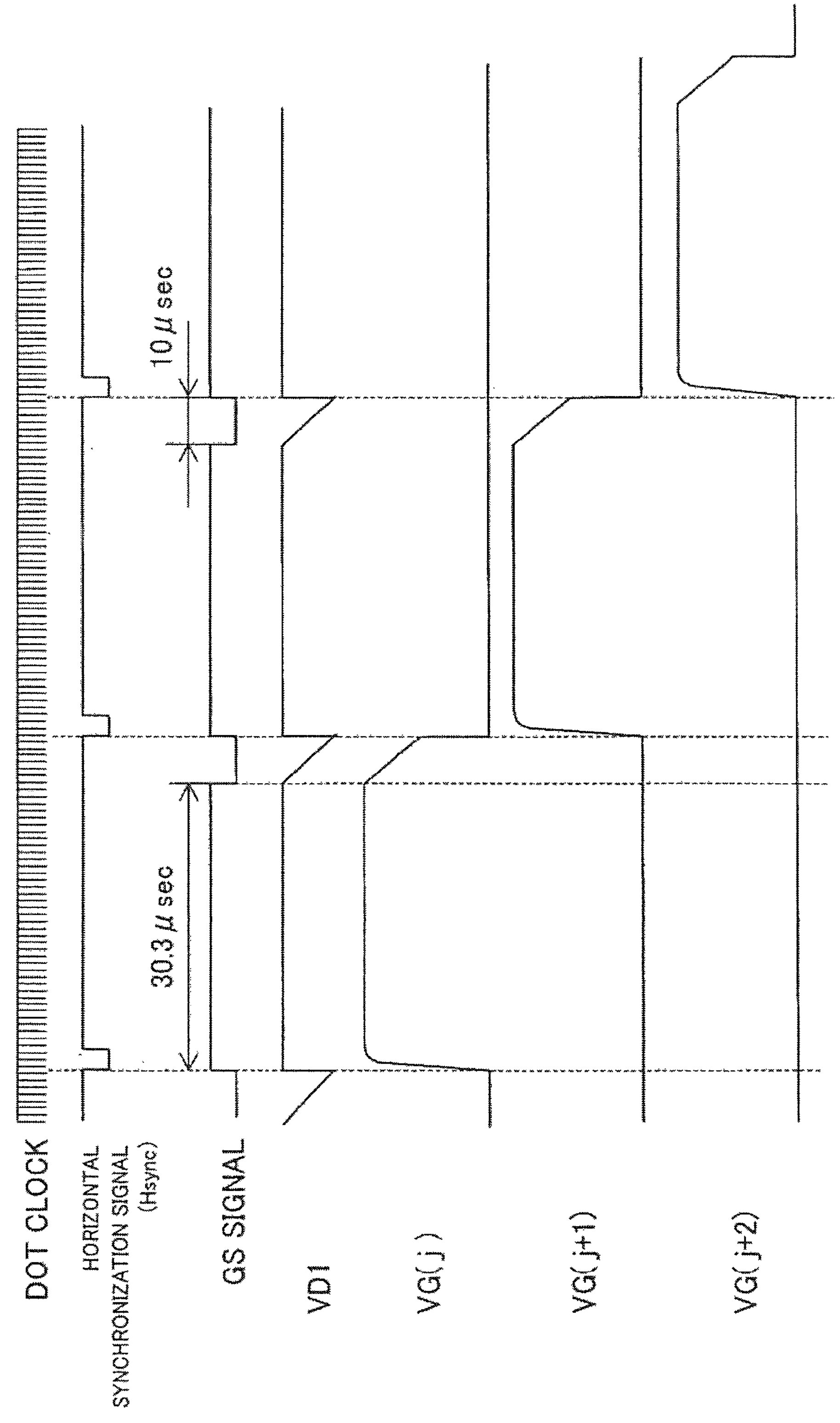
FIG. 14 is a timing chart showing a dot clock, a horizontal synchronization signal (Hsync), a GS signal, VD1, VG (j), VG (j+1), and VG (j+2), each occurred when a refresh rate is 40 Hz, in Embodiment 2.

In contrast, in a case where the gate slope signal is at a low level, the switch SW1 is opened, whereas the switch SW2 receives a gate slope signal of a high level via the inverter INV, and is closed in response to the gate slope signal. As such, the capacitor Ccnt discharges an acquired electrical charge via the resistor Rcnt, thereby gradually decreasing the voltage level from a Vgh voltage level. The gate slope period is a period during which the voltage level is decreased gradually, as in the above manner. Thus, a waveform of the VD1 signal (a signal generated by the VD1 generation circuit), which is the input signal supplied to one input terminal of the selection switch 12, is saw-tooth as later described, as shown in FIGS. 13 and 14.

Next, the present embodiment provides, as in the case of Embodiment 1, explanations of the most important parts of the present invention, i.e., a configuration of a graphic LSl 2 and a gate slope signal.

Figure 12:
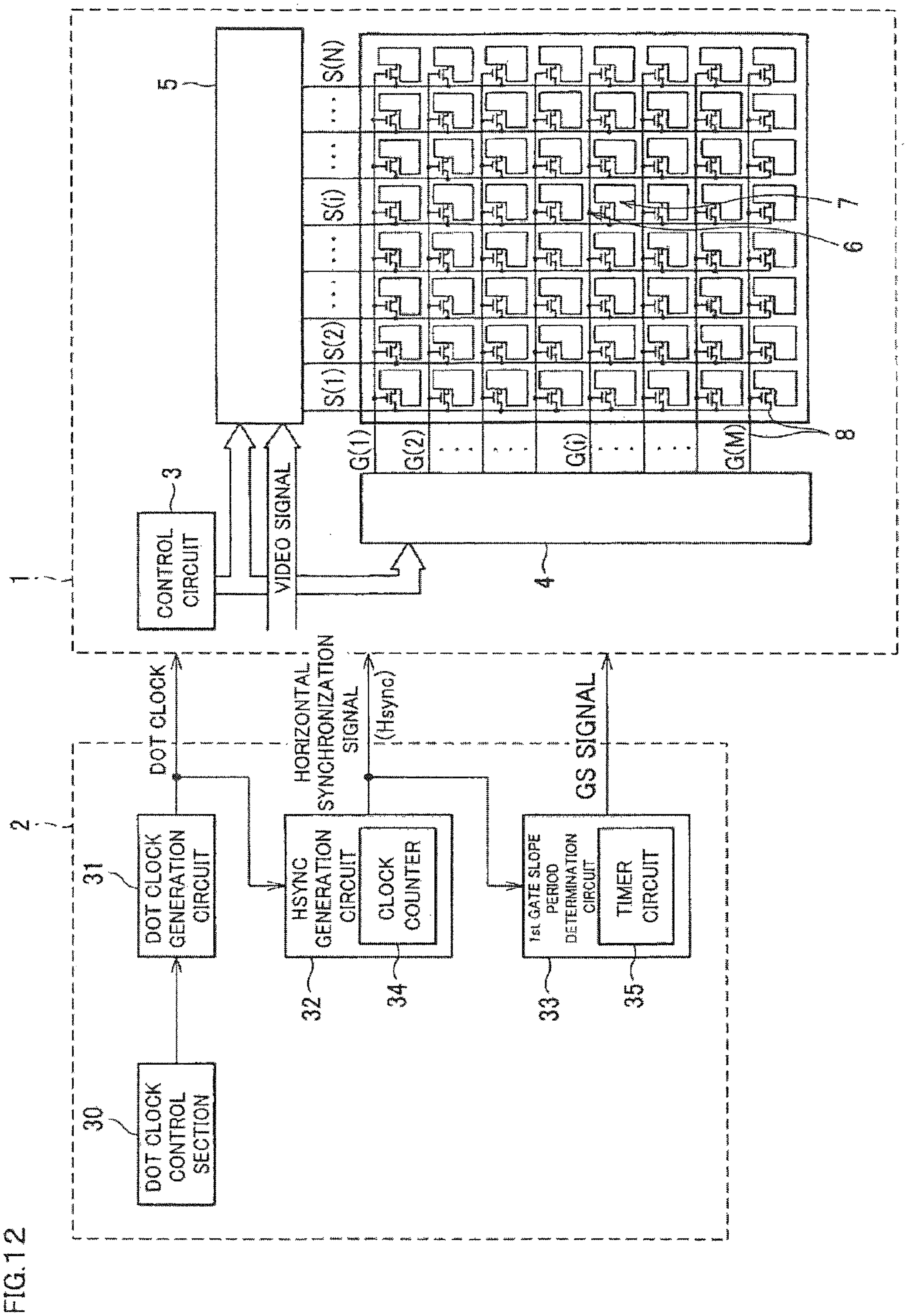
FIG. 12 is a block diagram showing a display system of Embodiment 2.

As shown in FIG. 12, a graphic LSl 2 includes a dot clock control section 30, a dot clock generation circuit 31, a horizontal synchronization signal generation circuit 32, and a first gate slope period determination circuit 33.

The horizontal synchronization signal generation circuit 32 includes a clock counter 34 for counting a dot clock, whereas the gate slope period determination circuit 33 includes a timer circuit 35.

The dot clock control section 30 determines a dot clock in accordance with a target refresh rate (frame rate), and sends, to the dot clock generation circuit 31, an instruction signal for the thus determined dot clock.

The dot clock generation circuit 31 receives the instruction signal from the dot clock control section 30, and generates the dot clock. As such, the dot clock of the present embodiment can be varied, depending on the refresh rate. This makes it possible, for example, that a low refresh rate (40 Hz) is used in a case where low power consumption is desired to be realized, whereas a normal refresh rate (60 Hz) is used in cases other than the above. The dot clock generation circuit 31 also sends the generated dot clock to a control circuit 3 of the dot clock display device 1 and to the horizontal synchronization signal generation circuit 32 of the graphic LSl 2.

The horizontal synchronization signal generation circuit 32 receives the dot clock from the dot clock generation circuit 31. In the horizontal synchronization signal generation circuit, the clock counter 34 counts the dot clock for fixed times. Then, the horizontal synchronization signal generation circuit 32 generates a horizontal synchronization signal. The horizontal synchronization signal generation circuit 32 sends the thus generated horizontal synchronization signal to the control circuit 3 of the display device 1 and to the first gate slope period determination circuit 33 of the graphic LSl 2.

As described above, the first gate slope period determination circuit 33 includes the timer circuit 35. The timer circuit 35 determines a gate slope period (GS signal_Low width), and the first gate slope period determination circuit 33 generates a gate slope signal. The timer circuit 35 measures time, based on a reference clock different from the dot clock.

The first gate slope period determination circuit 33 thus receives the horizontal synchronization signal that serves as a reset signal with respect to the gate slope signal. As such, the gate slope signal has the same cycle as the horizontal synchronization signal.

According to a conventional technique, a pixel writing period (GS signal_High width) and a gate slope period (GS signal_Low width) are set, based on a dot clock, i.e., the pixel writing period and the gate slope period are set by counting the dot clock. The dot clock is varied in the case where the refresh rate is changed. As such, in the case where the refresh rate is changed, the pixel writing period (GS signal_High width) and the gate slope period (GS signal_Low width) are varied in the conventional technique.

In contrast, in the first gate slope period determination circuit 33 of the present embodiment, the gate slope period (GS signal_Low width) is fixed regardless of whether and how the refresh rate is changed. The following description provides an explanation of a specific method for realizing the first gate slope period determination circuit 33.

The first gate slope period determination circuit 33 receives the horizontal synchronization signal from the horizontal synchronization signal generation circuit 32. Thus, in the first gate slope period determination circuit 33, a cycle of one horizontal synchronization signal can be calculated (that is, one cycle of the horizontal synchronization signal is equal to an interval between an input of the horizontal synchronization signal and another input of the horizontal synchronization signal). If the gate slope period (GS signal_Low width) fixed (determined) in advance is subtracted from the cycle (1H) of one horizontal synchronization signal, then the pixel writing period (GS signal_High width) can be calculated. A length of the thus calculated pixel writing period (GS signal_High width) is measured by the timer circuit 35, with the horizontal synchronization signal being used as the reset signal (as a trigger) (that is, upon receiving the horizontal synchronization signal, the timer circuit 35 starts measuring the pixel writing period (GS signal_High width)). This makes it possible to generate the gate slope signal having the fixed gate slope period (GS signal_Low width). Thus, regardless of whether and how the refresh rate is changed, the gate slope period (GS signal_Low width) can be fixed.

For example, FIG. 13 is a timing chart showing a dot clock, a horizontal synchronization signal (Hsync), a GS signal, VD1, VG(j), VG(j+1), and VG(j+2) occurred when the refresh rate is 60 Hz. On the other hand, FIG. 14 is a timing chart showing a dot clock, a horizontal synchronization signal (Hsync), a GS signal, VD1, VG(j), VG(j+1), and VG(j+2) occurred when the refresh rate is 40 Hz. Assume that the refresh rate is changed from 60 Hz (see FIG. 13) to 40 Hz (see FIG. 14). In the present embodiment, in this case, the gate slope period (GS signal_Low width) is measured, based on a reference clock, instead of on the dot clock, the reference clock being a clock different from the dot clock and provided in the timer circuit 35 of the first gate slope period determination circuit 33.

More specifically, when the refresh rate is changed from 60 Hz to 40 Hz, one cycle of the horizontal synchronization signal, occurred when the refresh rate is changed (i.e., when the refresh rate is changed to 40 Hz), is measured. As shown in FIG. 14, one cycle of the horizontal synchronization signal is 40.3 μsec. Then, the gate slope period (GS signal_Low width; 10 μsec) fixed in advance is subtracted from the one cycle of the horizontal synchronization signal. This leaves the pixel writing period (GS signal_High width) of 30.3 μsec.

As shown in FIG. 14, at timing when the horizontal synchronization signal is inputted, (i) the gate slope period is changed from a low level to a high level and (ii) the timer circuit 35 starts measuring the gate slope period (GS signal_High width). When 30.3 μsec passes after the timer circuit starts the measurement, the gate signal is changed from the high level to the low level. Then, the gate slope signal is again changed from the low level to the high level when the horizontal synchronization signal is inputted another time. After this, the same operations are repeated. This makes it possible to fix the gate slope period (GS signal_Low width). Thus, regardless of whether and how the refresh rate is changed, the gate slope period (GS signal_Low width) can be fixed.

FIG. 15 is a table in which the cases of the refresh rate of the 60 Hz and the refresh rate of 40 Hz are compared to each other in terms of a dot clock frequency, a clock counter, a horizontal synchronization frequency (Hsync frequency), a GS signal_High width (pixel writing period), and a GS signal_Low width (gate slope period). In particular, as is clear from the comparison of the cases in terms of the gate slope width, it is possible to fix the gate slope period (GS signal_Low width) between the cases of the refresh rate of 60 Hz and the refresh rate of 40 Hz.

The present embodiment is not limited to the above arrangement. Alternatively, in the present embodiment, it is also possible to set the gate slope period (GS signal_Low width) arbitrarily, depending on a property of the display device. The following description deals with the arrangement.

The following description raises, as examples, cases of display devices A and B having properties different from each other, so as to provide an explanation of the arrangement.

In the first gate slope period determination circuit 33, the gate slope period (GS signal_Low width) can also be determined, in addition to being determined in the arrangement described earlier, depending on a setting of a register. For the sake of easy understanding, the following description provides the explanation by using a table as shown in FIG. 16 in which settings of the register and gate slope periods (GS signal_Low width) are associated with each other, respectively.

In the table in FIG. 16, the settings of the register and GS signal_Low widths (gate slope periods) are associated with each other, respectively. As such, as shown in FIG. 16, a gate slope period (GS signal_Low width) is 5 μsec in a case where a register setting is (0, 0); a gate slope period (GS signal_Low width) is 10 μsec in a case where a register setting is (0, 1); a gate slope period (GS signal_Low width) is 15 μsec in a case where a register setting is (1, 0); and a gate slope period (GS signal_Low width) is 20 μsec in a case where a register setting is (1, 1.

The first gate slope period determination circuit 33 of the graphic LSI 2 receives from the display device 1, a signal corresponding to a property of the display device 1. For convenience, the signal is referred to as a register setting signal. The register setting signal is a signal for setting the register. Depending on the setting of the register, the gate slope period (GS signal_Low width) can be determined. For example, in the case of the display device A, the setting (0, 0) of the register is selected in accordance with a register setting signal, whereby the gate slope period (GS signal_Low width) is set at 5 μsec (see FIG. 16). On the other hand, in the case of the display device B, the setting (1, 0) of the register is selected in accordance with a register setting signal, whereby the gate slope period (GS signal_Low width) is set at 15 μsec (see FIG. 16). As such, it is possible to set the gate slope period (GS signal_Low width), depending on the property of the display devices. This makes it possible, as in the case described earlier, to fix a gate slope period (GS signal_Low width) regardless of whether and how the refresh rate is changed.

An effect derived from a conventional gate slope period is to reduce an in-plane flicker and ΔV. Thus, in the conventional technique, an offset voltage of a counter electrode is optimized (adjusted) in a condition where the in-plane flicker and the ΔV are being reduced. Reduction amounts of the in-plane flicker and ΔV are varied in a case where the gate slope period is changed. As such, in response to a change in the gate slope period, the offset voltage of the counter electrode is shifted from the optimized (adjusted) condition, thereby causing the in-plane flicker. In contrast, according to the present embodiment, the gate slope period can be fixed. This makes it possible to fix the reduction amounts of the in-plane flicker and the ΔV. Thus, even in the case where the refresh rate is changed, it is still possible to prevent the in-plane flicker to be generated.

Embodiment 3

C; Embodiment in which a Stable Pixel Writing Period and a Gate Slope Period are Fixed Further embodiment of the present invention is described below with reference to the attached drawings. The present embodiment explains a difference between the present embodiment and Embodiments 1 and 2. For an easy explanation, members having the same functions as those described in Embodiments 1 and 2 are given the same reference numerals, and explanations thereof are omitted.

In Embodiments 1 and 2, merely one of the gate slope period and the stable pixel writing period is controlled. In contrast, with the present embodiment, it is possible to control both the gate slope period and the stable pixel writing period.

Figure 23:
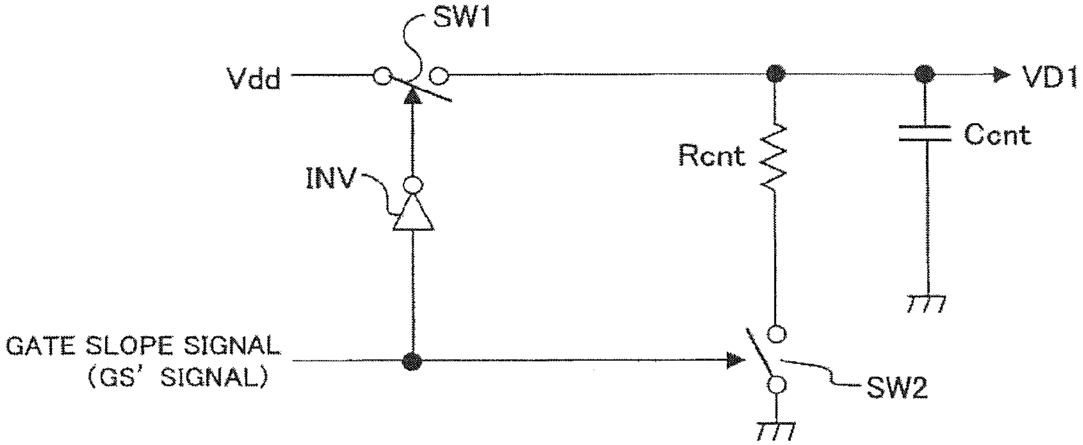
FIG. 23 is a circuit diagram showing an internal configuration of a VD1 generation circuit of Embodiment 3.
Figure 24:
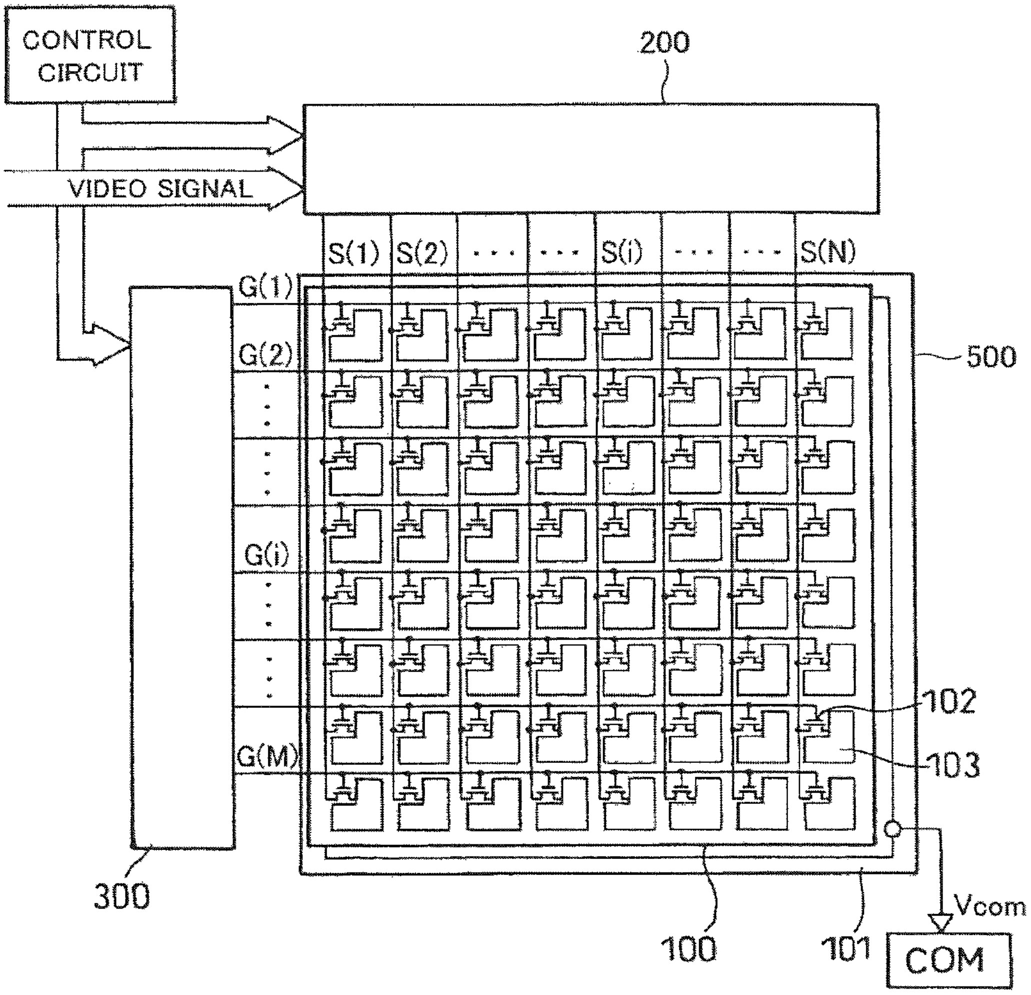
FIG. 24 is a diagram explaining a configuration of a conventional liquid crystal display device.
Figure 25:
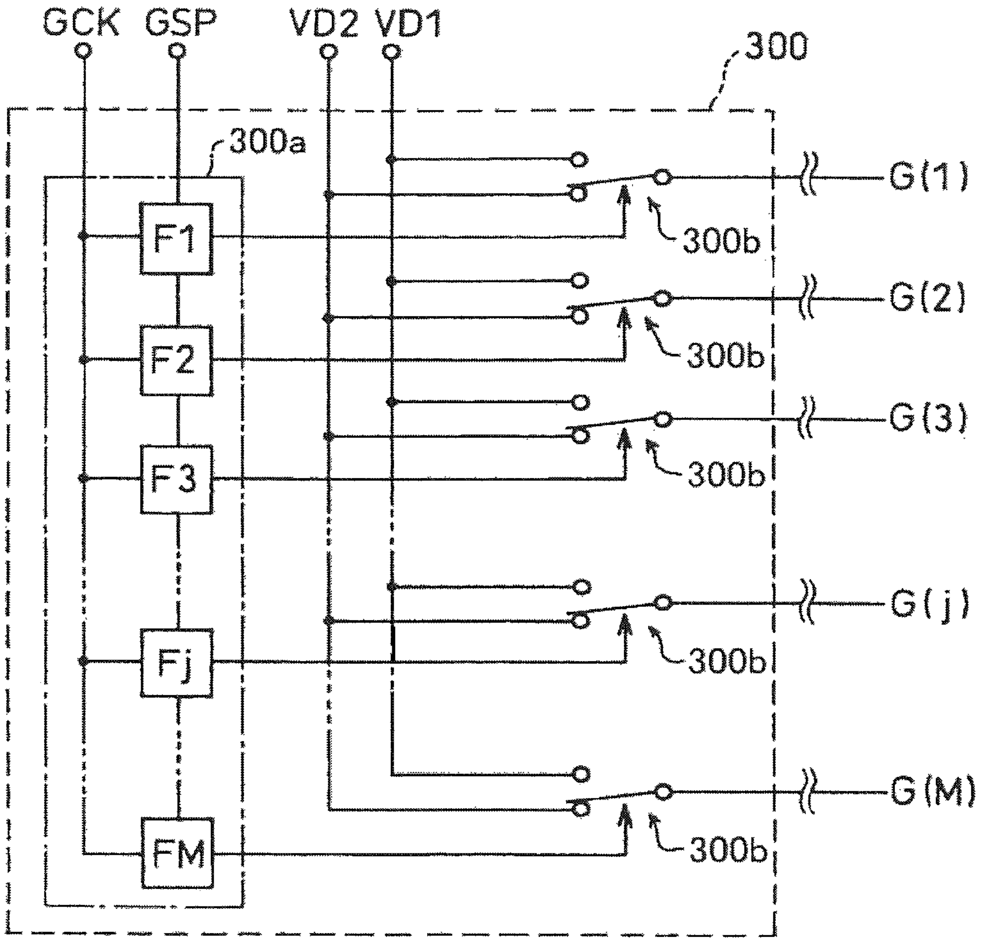
FIG. 25 is a diagram explaining a configuration example of a conventional scanning signal line driving circuit.
Figure 26:
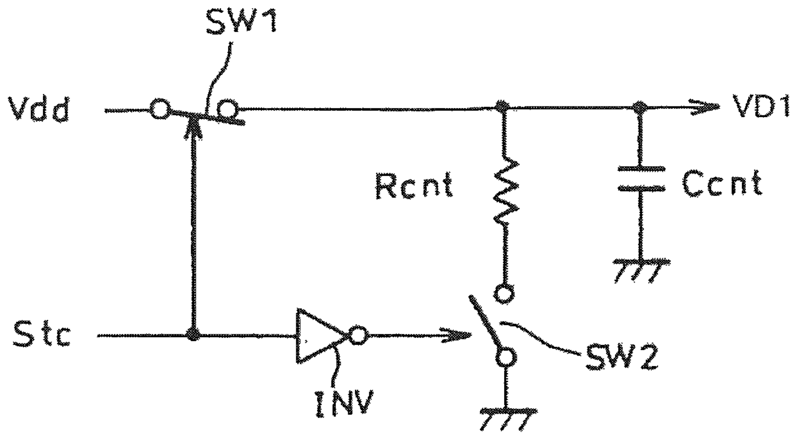
FIG. 26 is a circuit diagram showing an internal configuration of a conventional VD1 generation circuit.
Figure 27:
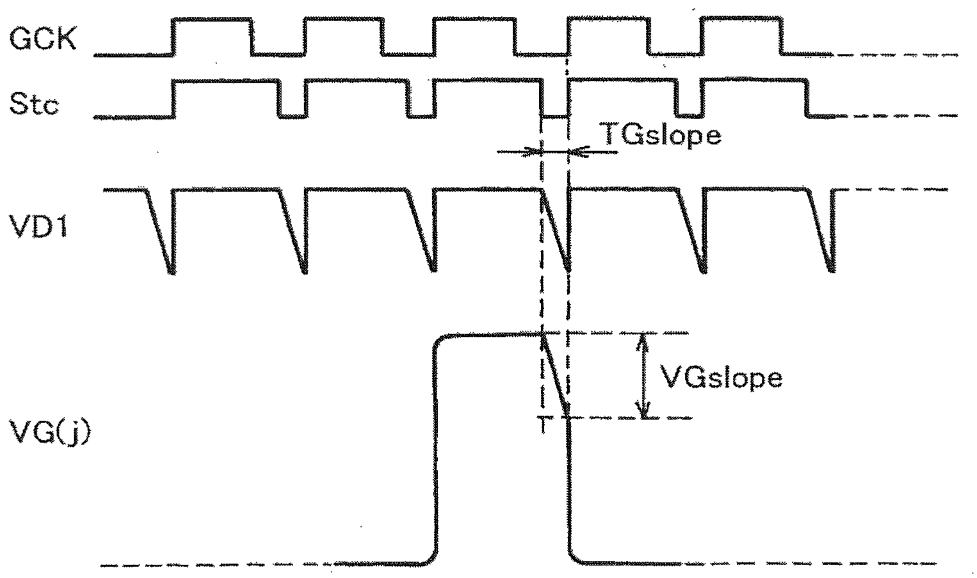
FIG. 27 is a waveform chart showing a voltage level of a main member of members shown in FIG. 26.
Figure 28:
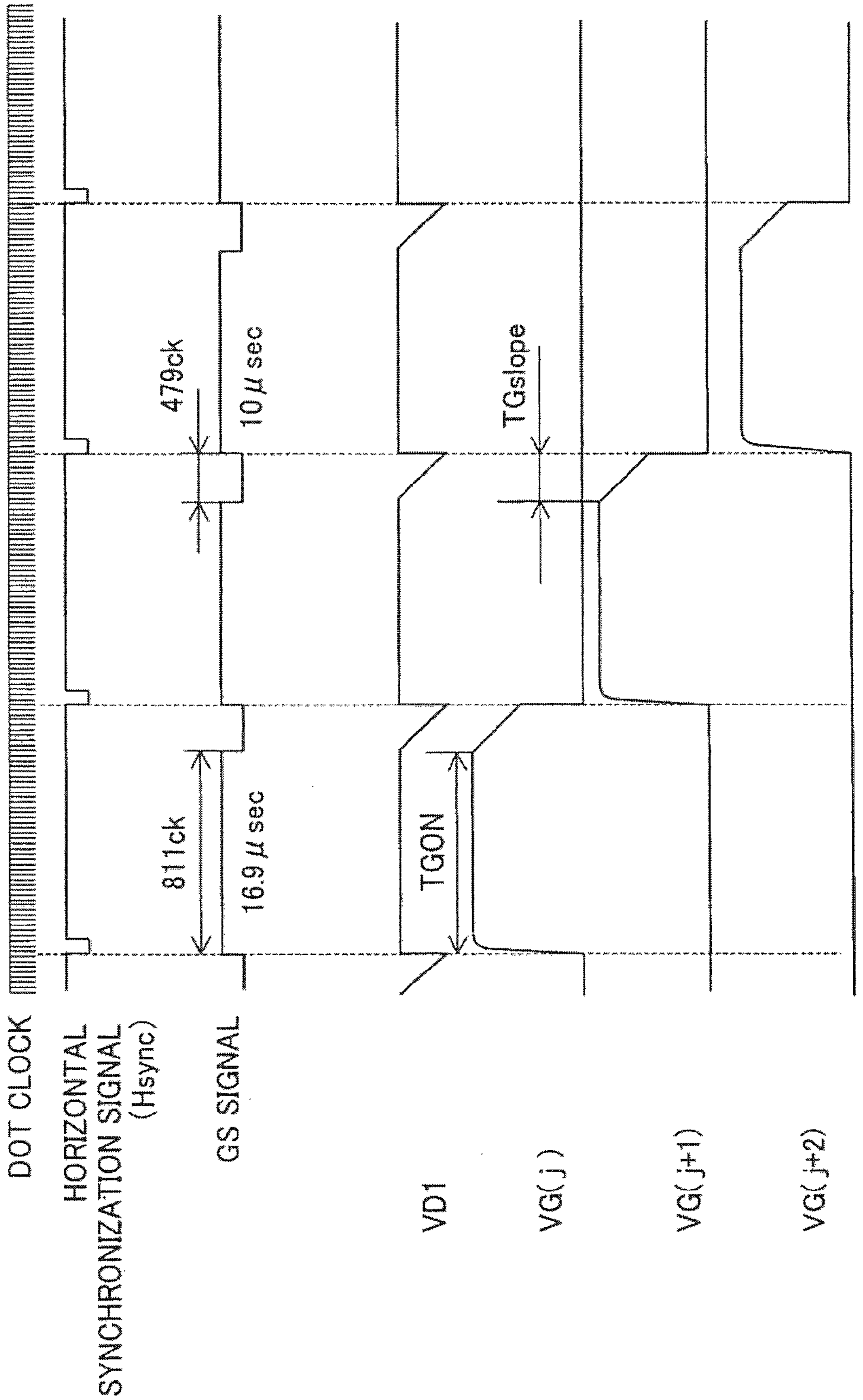
FIG. 28 is a timing chart showing a dot clock, a horizontal synchronization signal (Hsync), a GS signal, VD1, VG (j), VG (j+1), and VG (j+2), each occurred when a refresh rate is 60 Hz, in a conventional technique.
Figure 29:
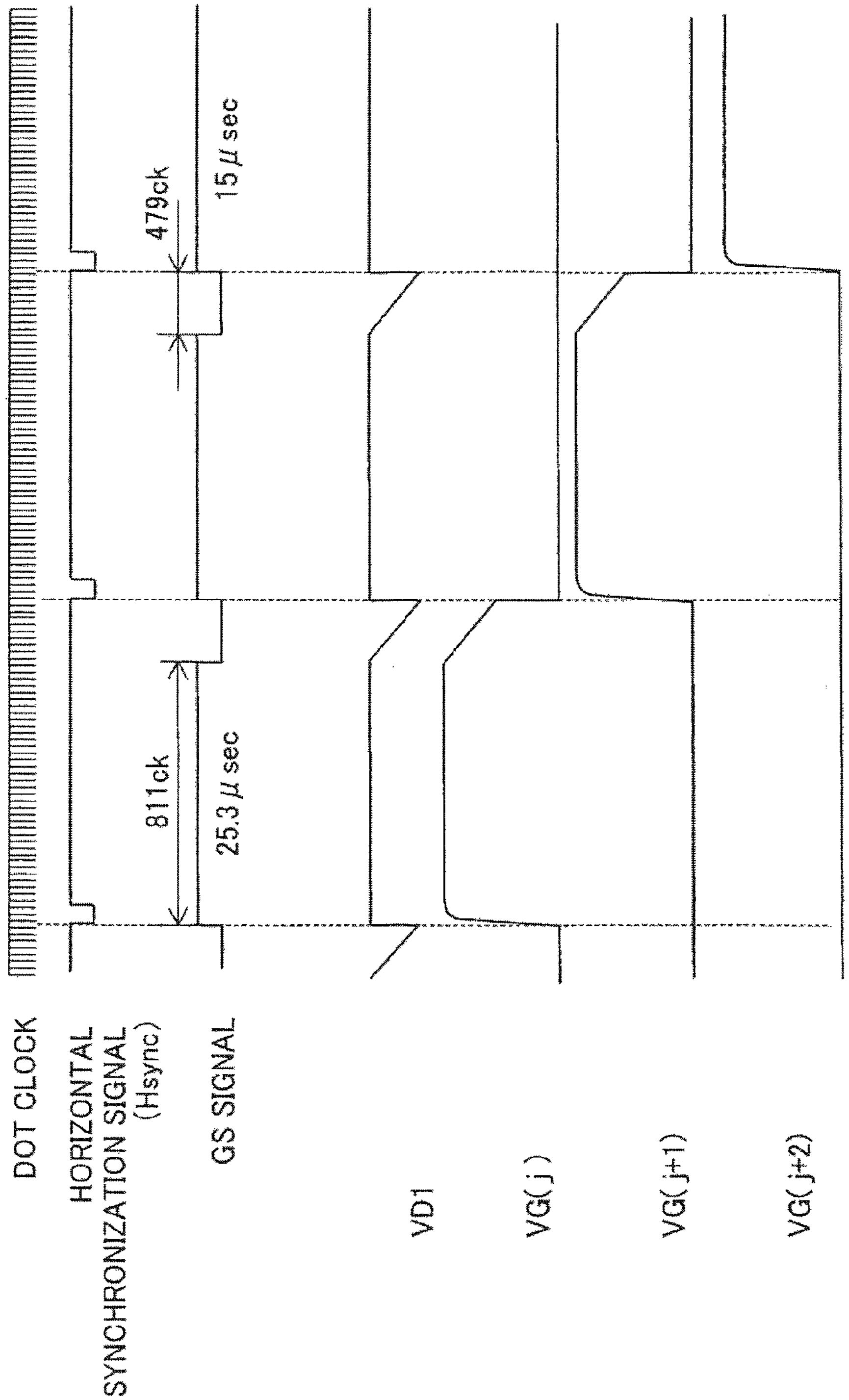
FIG. 29 is a timing chart showing a dot clock, a horizontal synchronization signal (Hsync), a GS signal, VD1, VG (j), VG (j+1), and VG (j+2), each occurred when a refresh rate is 40 Hz, in the conventional technique.

The present embodiment differs from Embodiments 1 and 2 in a configuration of a VD1 generation circuit. As shown in FIG. 23, a VD1 generation circuit 20' of the present embodiment externally receives a gate slope signal (GS' signal) different from a gate slope signal of Embodiment 1. Also, the VD1 generation circuit 20' includes an inverter INV between an input end, via which the gate slope signal (GS' signal) is supplied, and a switch SW1. As such, in the present embodiment, a gate slope period is caused when the gate slope signal (GS' signal) is at a high level, whereas in Embodiment 1, the gate slope period is caused when the gate slope signal (GS signal) is at a low level.

Figure 17:
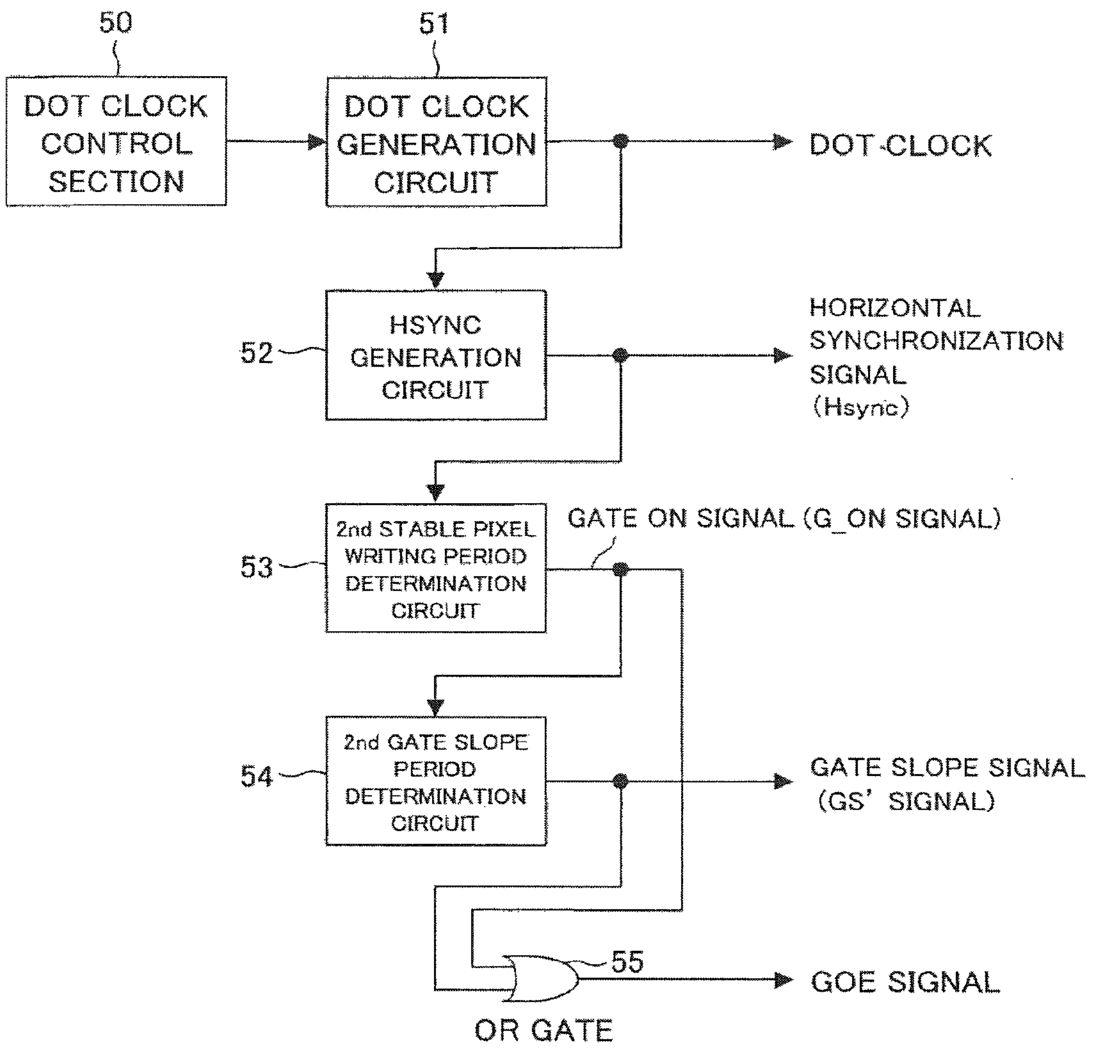
FIG. 17 is a block diagram showing a display controller of Embodiment 3.

As shown in FIG. 17, a graphic LSI 2 of the present embodiment includes (i) a dot clock control section 50, (ii) a dot clock generation circuit 51, (iii) a horizontal synchronization signal generation circuit 52, (iv) a second stable pixel writing period determination circuit (stable pixel writing period determining section) 53, (v) a second gate slope period determination circuit (gate slope period determining section) 54, and (vi) an OR gate 55. As in the case of Embodiment 1, the horizontal synchronization signal generation circuit 52 includes a clock counter (see FIG. 1). The second gate slope period determination circuit 54 includes a timer circuit (which is not illustrated) that measures time, based on a second reference clock which is different from the dot clock.

The second stable pixel writing period determination circuit 53 includes a timer circuit (which is not illustrated) that measures time, based on a first reference clock which is different from the dot clock. The second stable pixel writing period determination circuit 53 receives a horizontal synchronization signal.

In the second stable pixel writing period determination circuit 53, the timer circuit starts measuring a time period for a predetermined stable pixel writing period, based on the first reference clock, upon receiving the horizontal synchronization signal serving as a trigger (in other words, the measuring of the timer circuit is reset when the horizontal synchronization signal is inputted). The second stable pixel writing period determination circuit 53 generates a G_on signal. The G_on signal is changed from a low level to a high level at timing when the horizontal synchronization signal is inputted. Then, the G_on signal is kept at the high level for the predetermined period, and then kept at the low level until the horizontal signal is inputted again. As such, the G_on signal is a signal that is at the high level during the predetermined stable pixel writing period.

As described above, the second gate slope period determination circuit 54 includes the timer circuit (which is not illustrated) that measures time, based on the second reference clock different from the dot clock. The second gate slope period determination circuit 54 receives the G_on signal. In the second gate slope period determination circuit 54, at timing when the G_on signal is changed from the high level to the low level, the timer circuit starts measuring a time period for a predetermined gate slope period (GS' signal_High width), based on the second reference clock. The second gate slope period determination circuit 54 generates a gate slope signal (GS' signal). The gate slope is changed from a low level to a high level at timing when the G_on signal falls. Then, gate slope is kept at the high level for a predetermined period (gate slope period), and then kept at the low level until the G_on signal falls again. As such, the gate slope signal (GS' signal) is a signal that is kept at the high level during the predetermined gate slope period, the predetermined gate slope period starting at timing when the stable pixel writing period ends.

Figure 18:
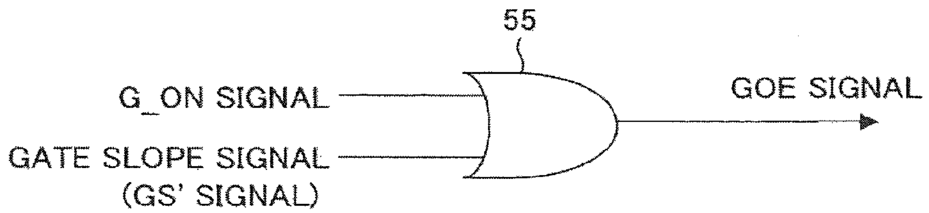
FIG. 18 is a diagram showing a configuration of a GOE signal generation circuit made of an OR gate shown in FIG. 17.

As shown in FIG. 18, the OR gate 55 has a function as a GOE signal generation circuit. The OR gate 55 receives the G_on signal and the gate slope signal (GS' signal), and then supplies its output signal (GOE signal; output disenabling signal) to the display device 1. The GOE signal is a signal (i) that is at a high level when at least either one of the G_on signal and the gate slope signal (GS' signal) is at the high level and (ii) that is at a low level when both the G_on signal and the gate slope signal (GS' signal) are at the low levels.

Figure 19:
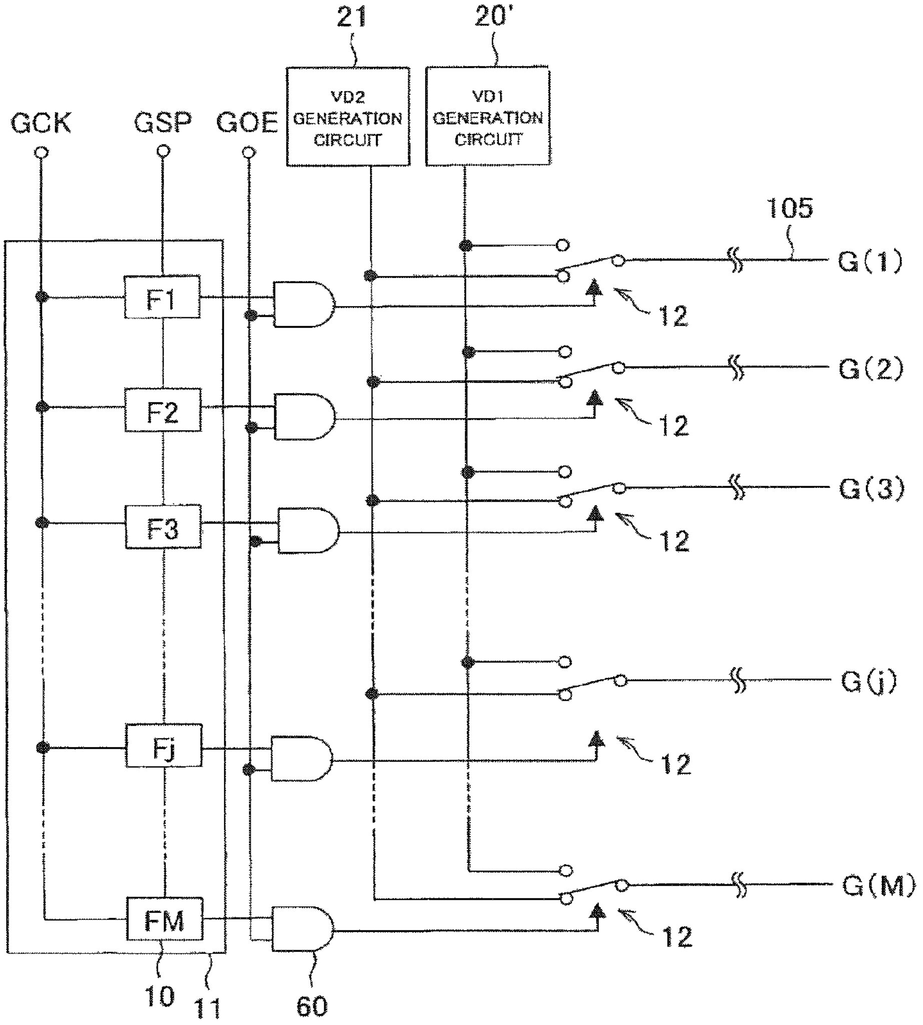
FIG. 19 is a circuit diagram showing an internal configuration of a scanning signal line driving circuit of Embodiment 3.

As shown in FIG. 19, a gate driver 4 of the present embodiment includes, in addition to the configuration described earlier, an input terminal via which the GOE signal is inputted. The scanning signal line driving circuit 4 further includes an AND gate 60 for receiving an output from each flip flop 10 and a GOE signal. An output from the AND gate 60 controls a selection switch 12.

As such, when the GOE signal is at the low level, the selection switch 12 is forcibly connected to a VD2 generation circuit. As a result, a gate OFF voltage Vgl at a sufficient level to turn off a TFT 8 is applied to a gate bus line. Thus, in the case where both the G_on signal and the gate slope period (GS' signal) are at the low level, the TFT 8 is forcibly turned off.

Figure 20:
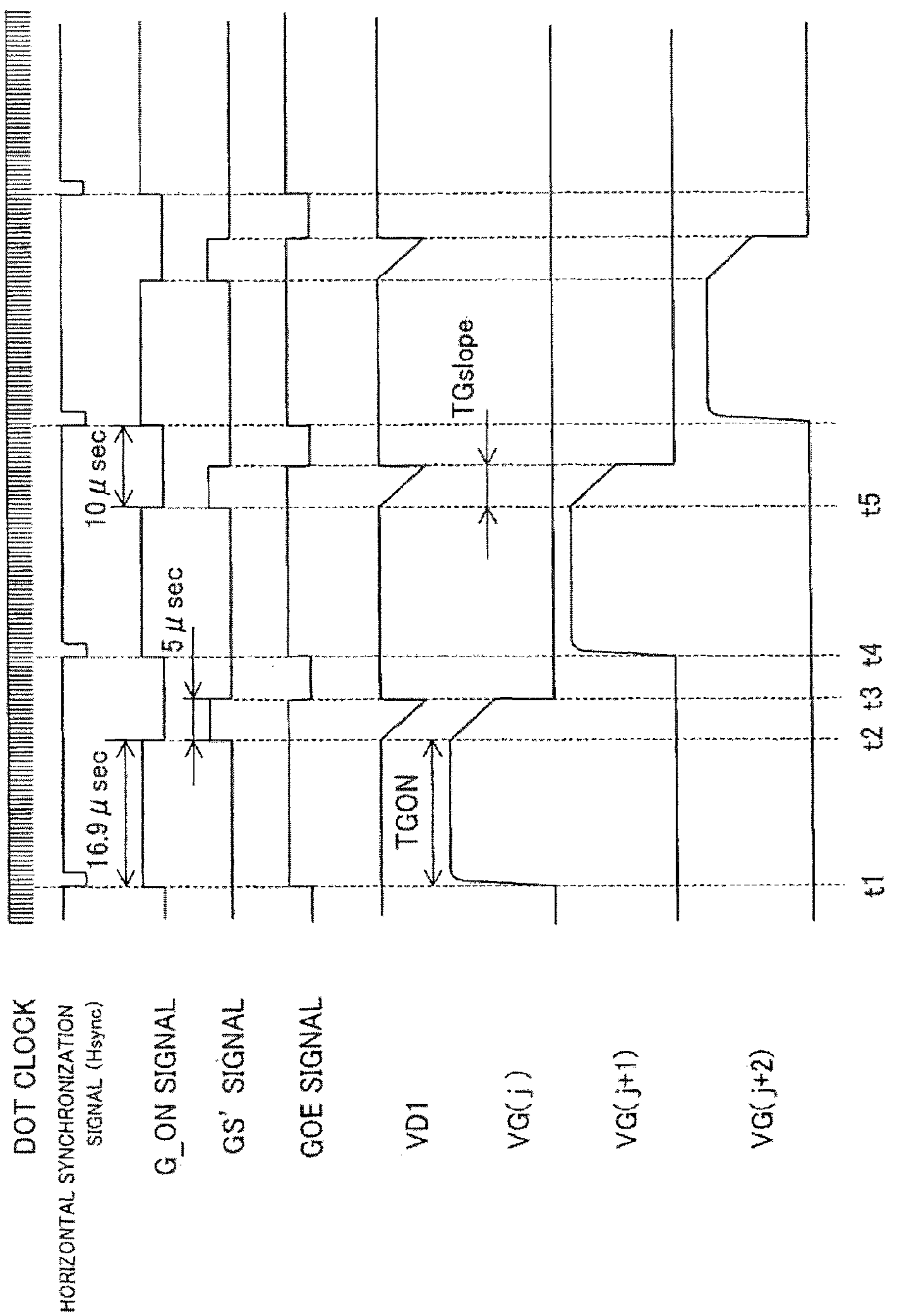
FIG. 20 is a timing chart showing a dot clock, a horizontal synchronization signal (Hsync), a G_ON signal, a GS' signal, a GOE signal, VD1, VG (j), VG (j+1), and VG (j+2), each occurred when a refresh rate is 60 Hz, in Embodiment 3.
Figure 21:
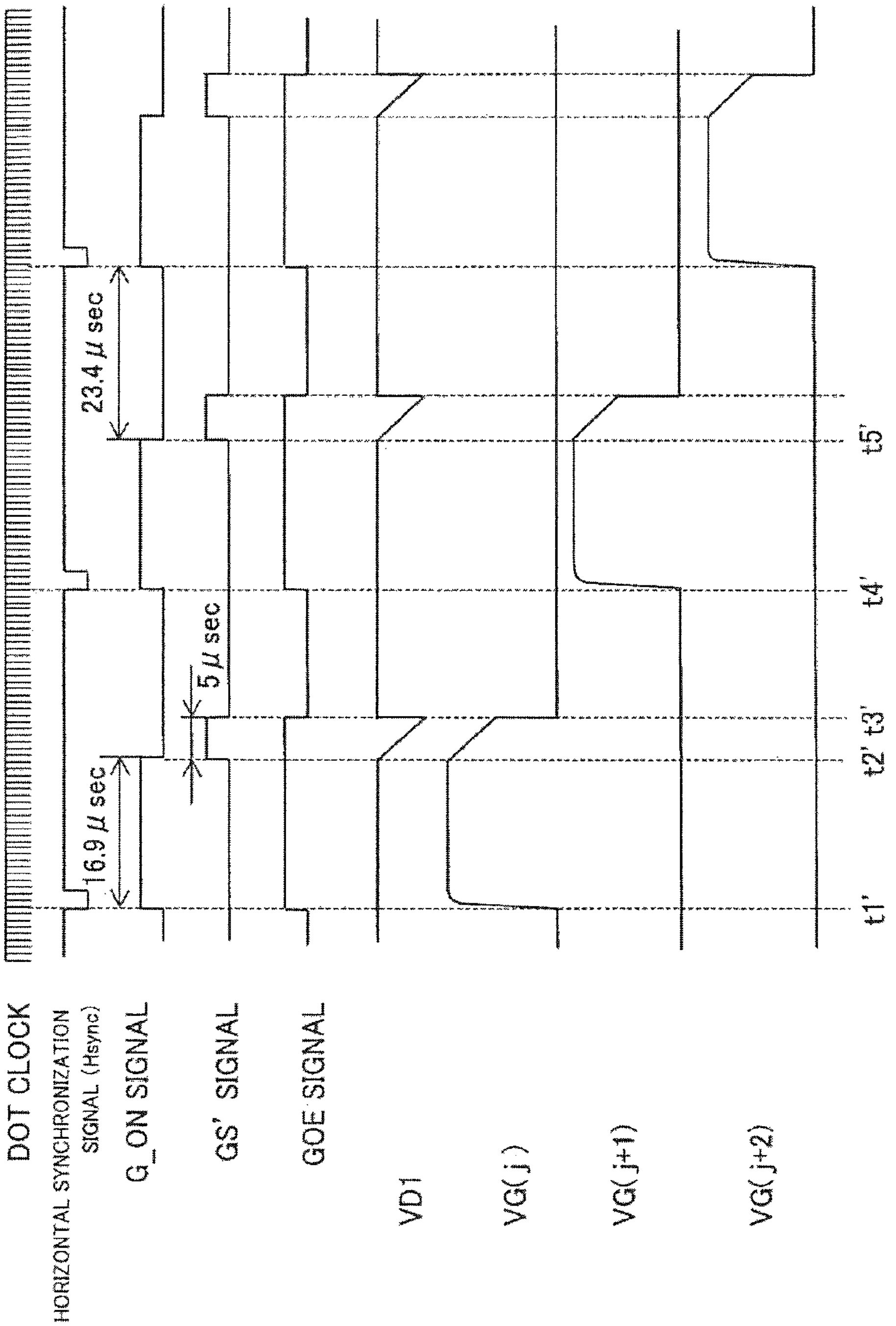
FIG. 21 is a timing chart showing a dot clock, a horizontal synchronization signal (Hsync), a G_ON signal, a GS' signal, a GOE signal, VD1, VG (j), VG (j+1), and VG (j+2), each occurred when a refresh rate is 40 Hz, in Embodiment 3.

With reference to FIGS. 20 and 21, the following description deals with cases in which the refresh rate is 60 Hz and in which the refresh rate is 40 Hz. The following description explains a timing chart showing a dot clock, a horizontal synchronization signal (Hsync), a gate slope signal (GS' signal), a GOE signal, VD1, VG(j), VG(j+1), and VG(j+2), each occurred when the present embodiment is used. FIG. 20 is a timing chart showing a dot clock, a horizontal synchronization signal (Hsync), a gate slope signal (GS' signal), a GOE signal, VD1, VG(j), VG(j+1), and VG(j+2) each occurred when the refresh rate is 60 Hz. FIG. 21 is a timing chart showing a dot clock, a horizontal synchronization signal (Hsync), a gate slope signal (GS' signal), a GOE signal, VD1, VG(j), VG(j+1), and VG(j+2), each occurred when the refresh rate is 40 Hz.

As shown in FIG. 20, at time t1, the G_on signal is changed from the low level to the high level at timing when the horizontal synchronization signal is inputted in the second stable pixel writing period determination circuit 53. In the second stable pixel writing period determination circuit 53, at timing when the G_on signal is changed to the high level, the timer circuit starts measuring the predetermined stable pixel writing period (in this case, the predetermined stable pixel writing period is 16.9 μsec), based on the first reference clock. At time t2, occurred 16.9 μsec (the predetermined stable pixel writing period) after the time t1, the G_on signal is changed from the high level to the low level. The G_on signal is changed from the low level to the high level at timing when the horizontal signal is inputted in the second stable pixel writing period determination circuit 53 another time. After this, the same operations are repeated.

The second gate slope period determination circuit 54 receives the G_on signal, and then generates the gate slope signal. The gate slope signal is changed from the low level to the high level at the time t2, at which the G_on signal is changed from the high level to the low level. In the second gate slope period determination circuit 54, at timing (at the time t2) when the gate slope signal (GS' signal) is changed from the low level to the high level, the timer circuit starts measuring the predetermined gate slope period (in this case, the predetermined gate slope period is 5 μsec), based on the second reference clock. At time t3, occurred 5 μsec (the predetermined gate slope period) after the time t2, the gate slope signal (GS' signal) is changed from the high level to the low level. In the gate slope signal determination circuit 54, the gate slope signal (GS' signal) is changed from the low level to the high level at time t5, at which the G_on signal is changed from the high level to the low level another time. After this, the same operations are repeated.

Within one horizontal period, the GOE signal is kept at a low level between times t3 and t4, during which both the G_on signal and the gate slope signal (GS' signal) are at the low levels. The GOE signal is kept at the high level except between the times t3 and t4.

Thus, in VG(j), a stable pixel writing period (G_on signal_ High width) is caused between the times t1 and t2, the gate slope period (GS' signal_High width) is caused between the times t2 and t3, and the gate OFF period is caused between the time t3 and t4. In the VG(j+1) and VG(j+2), the same operations as carried out in the VG(j) are carried out repeatedly. In the VG(j+1) and VG(j+2), these operations are sequentially shifted from each other by one horizontal period.

According to the above method, even if the refresh rate is changed to 40 Hz, as shown in FIG. 21, the stable pixel periods (a period between time t1 and time t2 and a period between time t1' and time t2') and the gate slope periods (a period between time t2 and t3 and a period between time t2' and time t3') can be fixed, whereas gate OFF periods (a period between times t3' and t'4 and a period between times the time t3 and t4) are different from each other.

As such, as shown in FIGS. 20 and 21, the cases of the refresh rate of 60 Hz and the refresh rate of 40 Hz are different from each other in terms of the dot clock frequency, the cycle of a horizontal synchronization signal (Hsync), and the gate OFF period (GOE signal_Low width), whereas the cases are the same with each other in terms of the stable pixel writing period and the gate slope period, in particular.

FIG. 22 is a table of the present embodiment, in which the cases of the refresh rate of 60 Hz and the refresh rate of 40 Hz are compared to each other in terms of the dot clock frequency, the clock counter, the cycle of the Hsync, the stable pixel writing period (G_on signal_High width), the gate slope period (GS' signal_High width), and the gate OFF period (GOE signal_Low width). As shown in FIG. 22, in either cases of the refresh rates of 60 Hz and 40 Hz, it is possible to fix the gate slope period (GS' signal_High width) and the stable pixel writing period (G_on signal_High width).

As shown in FIG. 23, a VD1 generation circuit of the preset embodiment differs from the VD1 generation circuit of Embodiment 2 in that it includes the INV (inverter) between the input end via which the GS' signal is inputted and the switch SW1. This causes the GS' signal_High width to be the gate slope period in the present embodiment, whereas the GS signal_Low width is the gate slope period in Embodiment 2.

A switching element OFF period is a period during which a scanning signal line driving circuit outputs a scanning off voltage (off level) at a sufficient level to turn off a pixel switch on a scanning line.

In the present embodiment, one horizontal synchronization period includes the stable pixel writing period, the gate slope period, and the switching element OFF period (gate OFF period). Alternatively, in the present embodiment, one horizontal synchronization period may include, for example, the stable pixel period and the switching element OFF period (gate OFF period). In the present invention, a signal (i.e., GOE signal) that turns OFF the switching element is generated by an OR gate that receives a G_on signal and a GS signal. The OR gate may be included by a component such as a gate driver or the like. This allows the gate driver to generate the GOE signal.

With the present embodiment, as in the cases of Embodiments 1 and 2, it is possible to arbitrarily set a stable pixel writing period and a gate slope period, depending on a setting of a register.

In the present embodiment, the OR gate 55 is provided in the graphic LSl 2, and the GOE signal is generated in the graphic LSL 2. Alternatively, in the present embodiment, the OR gate may be provided in an LCD (display device) 1, and the GOE signal may be generated in the LCD 1.

Furthermore, the first reference clock and the second reference clock may or may not be the same with each other.

The invention is not limited to the thus described arrangements. Instead, the arrangements described in Embodiments may be applied in many variations, provided that such variations do not exceed the scope of the patent claims set forth below. An embodiment based on a proper combination of technical means disclosed in different embodiments is encompassed in the technical scope of the present invention.

Thus, the display controller of the present invention is a display controller for controlling a display device including (i) a plurality of pixels, (ii) picture signal lines for supplying data signals to the pixels, (iii) scanning signal lines intersecting the picture signal lines, respectively, and (iv) a scanning signal line driving circuit for driving the scanning signal lines by outputting scanning signals thereto, the display controller including stable pixel writing period determining section that, based on a reference signal independent from a frame rate in the display device, determines a stable pixel writing period out of one horizontal period in the display device, the pixel writing period being a period during which a voltage level outputted from the scanning signal line driving circuit is high.

Also, the control method of the present invention for controlling a display device is a control method for controlling a display device that includes (i) a plurality of pixels, (ii) picture signal lines for supplying data signals to the pixels, (iii) scanning signal lines intersecting the picture signal lines, respectively, and (iv) a scanning signal line driving circuit for driving the scanning signal lines by outputting scanning signals thereto, the method including determining a stable pixel writing period out of one horizontal period in the display device, based on a reference signal independent from a frame rate in the display device, the stable pixel writing period being a period during which a voltage level outputted from the scanning signal line driving circuit is high.

It is therefore possible to set the stable pixel writing period at the target length regardless of whether and how the frame rate is changed.

Furthermore, the display controller of the present invention is a display controller for controlling a display device including (i) a plurality of pixels, (ii) picture signal lines for supplying data signals to the pixels, (iii) scanning signal lines intersecting the picture signal lines, respectively, and (iv) a scanning signal line driving circuit for driving the scanning signal lines by outputting scanning signals thereto, the display controller including gate slope period determining section that, based on a reference signal independent from a frame rate in the display device, determines a gate slope period out of one horizontal period in the display device, the gate slope period being a period during which a voltage level outputted from the scanning signal line driving circuit is decreased.

Also, the control method of the present invention for controlling a display device is a control method for controlling a display device including (i) a plurality of pixels, (ii) picture signal lines for supplying data signals to the pixels, (iii) scanning signal lines intersecting the picture signal lines, and (iv) a scanning signal line driving circuit for driving the scanning signal lines by outputting scanning signals thereto, the control method including determining a gate slope period out of one horizontal period in the display device, based on a reference signal independent from a frame rate in the display device, the gate slope period being a period during which a voltage level outputted from the scanning signal line driving circuit is decreased.

It is therefore possible to set the gate slope period at the target length regardless of whether and how the frame rate is changed.

Furthermore, the display controller of the present invention is a display controller for controlling a display device including (i) a plurality of pixels, (ii) picture signal lines for supplying data signals to the pixels, (iii) scanning signal lines intersecting the picture signal lines, respectively, (iv) switching elements provided on intersections of the picture signal lines and the scanning signal lines, and (v) a scanning signal line driving circuit for driving the scanning signal lines by outputting scanning signals thereto, the display controller including: stable pixel writing period determining section that determines a stable pixel period out of one horizontal period, based on a first reference signal independent from a frame rate, the stable pixel writing period being a period during which a voltage level outputted from the scanning signal line driving circuit is high; and gate slope period determining section that determines a gate slope period out of the one horizontal period, based on a second reference signal independent from the frame rate, so that the gate slope period starts at timing when the stable pixel writing period ends, the gate slope period being a period during which the voltage level outputted from the scanning signal line driving circuit is decreased, the one horizontal period also including a switching OFF period during which the voltage level outputted from the scanning signal line driving circuit is low.

Also, the control method of the present invention for controlling a display device is a control method for controlling a display device including (i) a plurality of pixels, (ii) picture signal lines for supplying data signal lines to the pixels, (iii) scanning signal lines intersecting the picture signal lines, respectively, (iv) switching elements provided on intersections of the picture signal lines and the scanning signal lines, and (iv) a scanning signal line driving circuit for driving the scanning signal lines by outputting scanning signals thereto, the control method including: determining a stable pixel writing period out of one horizontal period, based on a first reference signal independent from a frame rate, the stable pixel writing period being a period during which a voltage level outputted from the scanning signal line driving circuit is high; determining a gate slope period out of the one horizontal period, based on a second reference signal independent from the frame rate, such that the gate slope period starts at timing when the stable pixel writing period ends, the gate slope period being a period during which the voltage level outputted from the scanning signal line driving circuit is decreased; and turning off the switching elements during a switching OFF period out of the one horizontal period, the switching element turning OFF period being a period during which the voltage level outputted from the scanning signal line driving circuit is low.

It is therefore possible to set the stable pixel writing period and the gate slope period at the target lengths regardless of whether and how the frame rate is changed.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention can be suitably used in a mobile device, in particular, such as a mobile phone, a next-generation LCD compatible with one segment broadcasting, or an UMPC.

The invention claimed is:

1. A display controller for controlling a display device, the display device including (i) a plurality of pixels, (ii) picture signal lines for supplying data signals to the pixels, (iii) scanning signal lines intersecting the picture signal lines, respectively, and (iv) a scanning signal line driving circuit for driving the scanning signal lines by outputting scanning signal thereto, the display controller comprising:

a stable pixel writing period determining section configured to, determine a stable pixel writing period out of one horizontal period of a horizontal synchronization signal of the display device, the stable pixel writing period being a period during which a voltage level output from the scanning signal line driving circuit is sufficiently high such that transistors on the scanning signal lines are turned on within one horizontal period, and maintain the determined stable pixel writing period even if a frame rate in the display device is changed; and a gate slope period determining section configured to, determine a gate slope period out of the one horizontal period of the horizontal synchronization signal, the gate slope period being a period during which a voltage level of the scanning signal output from the scanning signal line driving circuit decreases, and maintain the determined gate slope period even if the frame rate is changed.

2. The display controller of claim 1, wherein the stable pixel writing period determining section is configured to determine the stable pixel writing period out of one horizontal period in the display device by changing a dot clock count based on the frame rate in the display device.

3. The display controller of claim 2, wherein the gate slope determining section is configured to determine the gate slope period out of the one horizontal period by changing the dot clock count based on the frame rate in the display device such that the gate slope period starts when the stable pixel writing period ends.

4. The display controller of claim 1, wherein gate slope period determining section maintains the gate slope period even if the frame rate is changed by, measuring a cycle of the horizontal synchronization signal when the frame rate changes from a current refresh rate to a new frame rate, and determining the gate slope period based on at least a gate slope period and a stable pixel period associated with a previous frame rate and the measured cycle of the horizontal synchronization signal when the frame rate changes from the current frame rate to the new frame rate.

5. The display controller of claim 1, wherein the scanning signal line driving circuit includes at least, a first switch having a first terminal via which a direct voltage is applied to the first switch, and a capacitor component and a resistor component which are connected with a second terminal of the first switch, the gate slope period being a period in which the capacitor discharges from the direct voltage such that the voltage level of the scanning signals output from the scanning signal line driving circuit decreases.

6. The display controller of claim 5, wherein the gate slope period determining section determines the gate slope period based on a reference signal that is independent of the frame rate, and the scanning signal line driving circuit further includes, a second switch for causing the capacitor component to discharge via the resistor component, and an inverter for opening and closing the first switch or the second switch based on the reference signal.

7. The display controller of claim 1, wherein the display controller is configured to maintain the stable pixel writing period and the gate slope period such that the scanning signals generated by the scanning signal line driving circuit remains a saw-tooth waveform even if the frame rate in the display device is changed.

8. A method for controlling a display device, the display device including (i) a plurality of pixels, (ii) picture signal lines for supplying data signals to the pixels, (iii) scanning signal lines intersecting the picture signal lines, respectively, and (iv) a scanning signal line driving circuit for driving the scanning signal lines by outputting scanning signal thereto, the method comprising:

determining a stable pixel writing period out of one horizontal period of the horizontal synchronization signal of the display device, the stable pixel writing period being a period during which a voltage level output from the scanning signal line driving circuit is high;

maintaining the determined stable pixel writing period even if a frame rate in the display device is changed;

determining a gate slope period out of the one horizontal period of the horizontal synchronization signal, the gate slope period being a period during which a voltage level of the scanning signal output from the scanning signal line driving circuit decreases; and maintaining the determined gate slope period even if the frame rate is changed.

9. The method of claim 8, wherein the determining a stable pixel writing period comprises:

changing a dot clock count based on the frame rate in the display device.

10. The method of claim 9, wherein the determining a gate slope period comprises:

changing the dot clock count, depending on the frame rate in the display device, such that the gate slope period starts when the stable pixel writing period ends.

11. The method of claim 8, wherein maintaining the determined gate slope period comprises:

measuring a cycle of the horizontal synchronization signal when the frame rate changes from a current refresh rate to a new frame rate; and determining the gate slope period based on at least a gate slope period and a stable pixel period associated with a previous frame rate and the measured cycle of the horizontal synchronization signal when the frame rate changes from the current frame rate to the new frame rate.

12. The method of claim 8, wherein the display controller is configured to maintain the stable pixel writing period and the gate slope period such that the scanning signals generated by the scanning signal line driving circuit remains a saw-tooth waveform even if the frame rate in the display device is changed.

* * * * *